Dec. 26, 1939.  E. L. TORNQUIST  2,184,982
CONTROL SYSTEM FOR HEATING
Filed July 5, 1934  7 Sheets-Sheet 1

Inventor:
Earl L. Tornquist
By Brown, Jackson, Boettcher & Dienner
Attys.

Dec. 26, 1939.   E. L. TORNQUIST   2,184,982
CONTROL SYSTEM FOR HEATING
Filed July 5, 1934   7 Sheets-Sheet 2
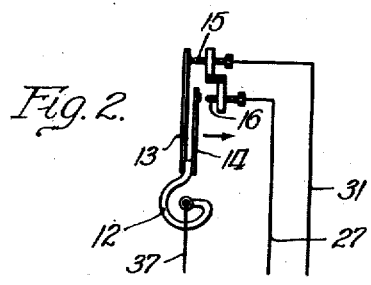
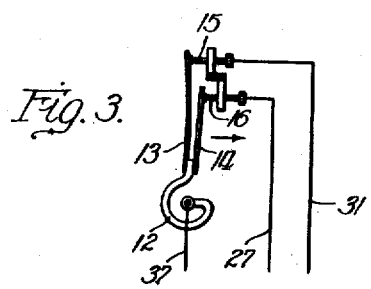
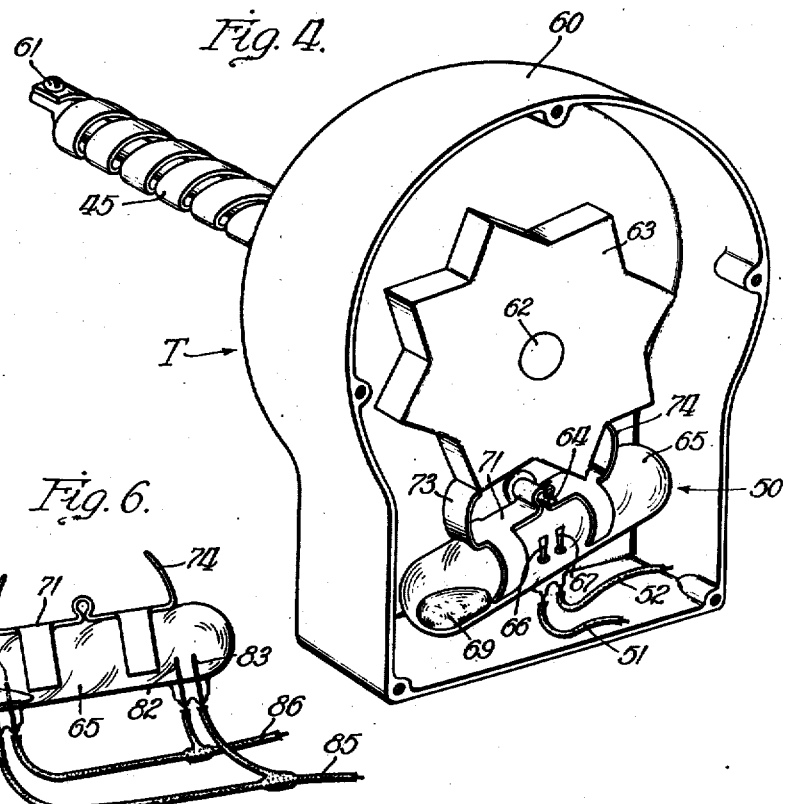
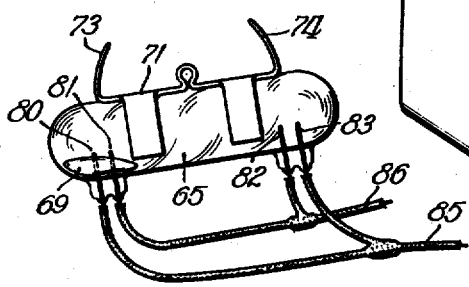
Inventor:
Earl L. Tornquist
By: Brown, Jackson, Boettcher & Dienner
Attys.

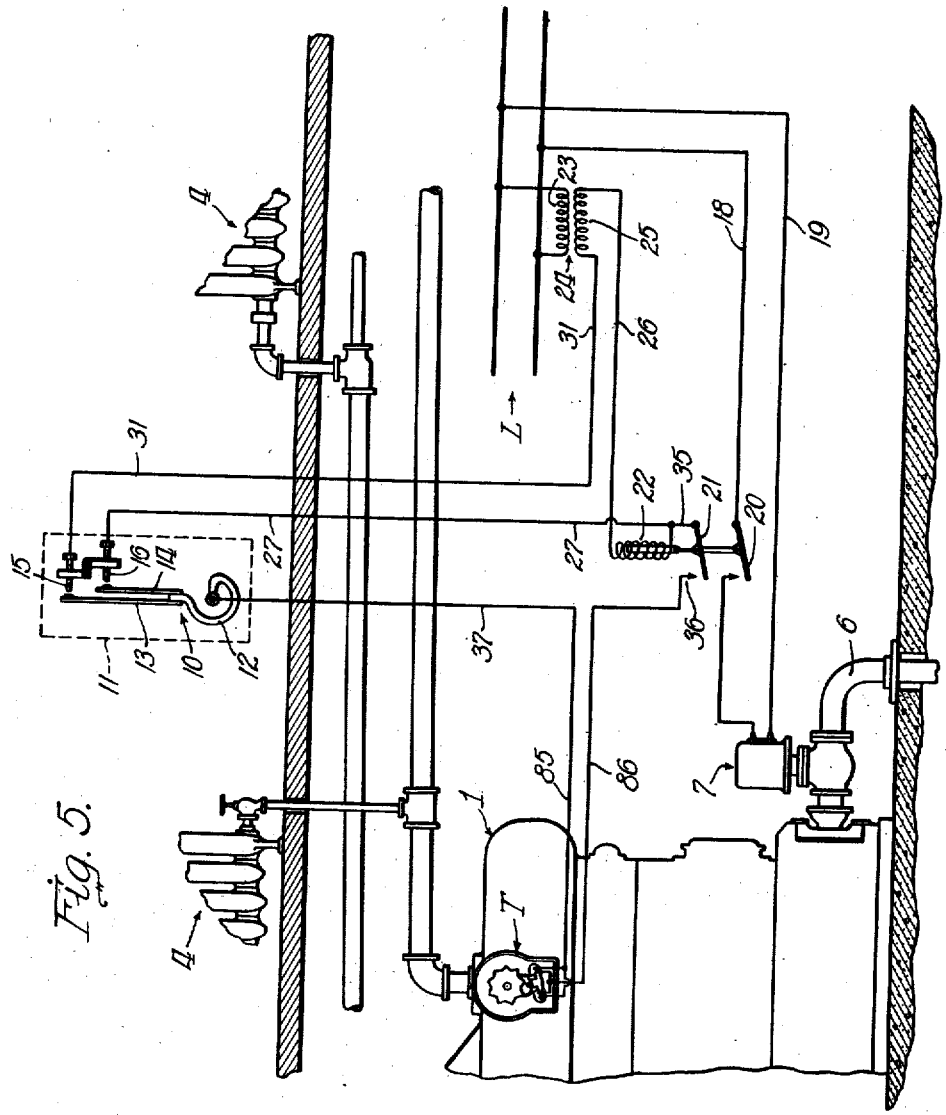

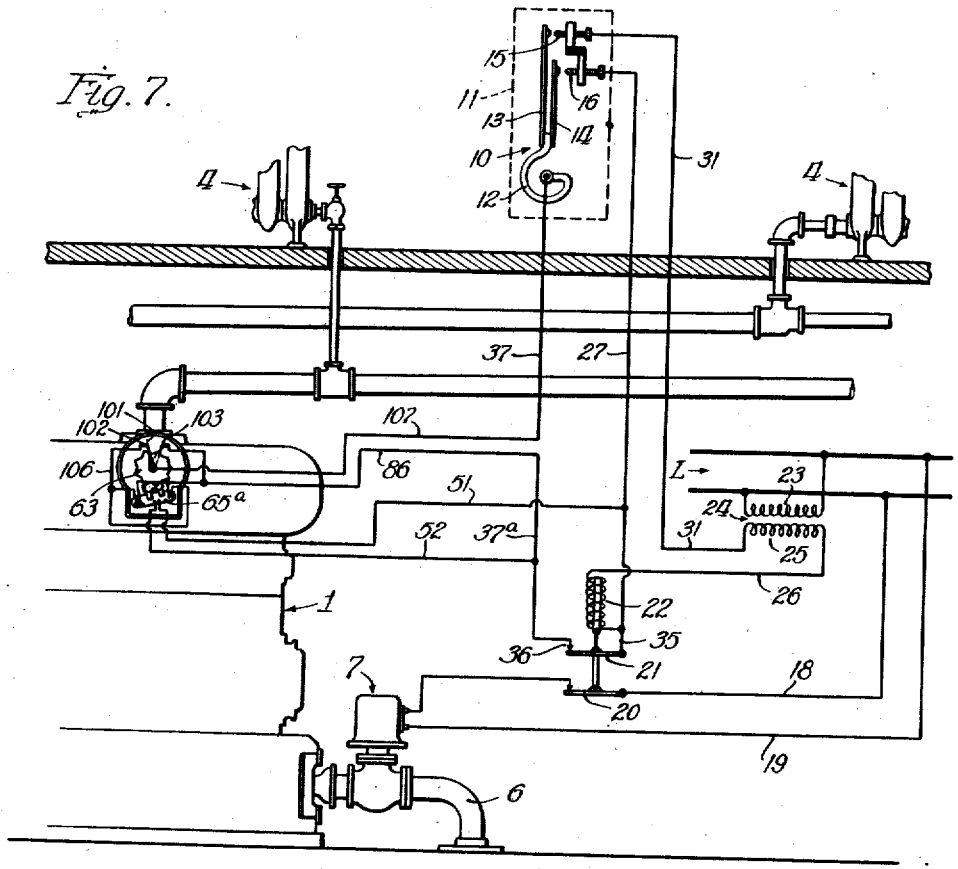
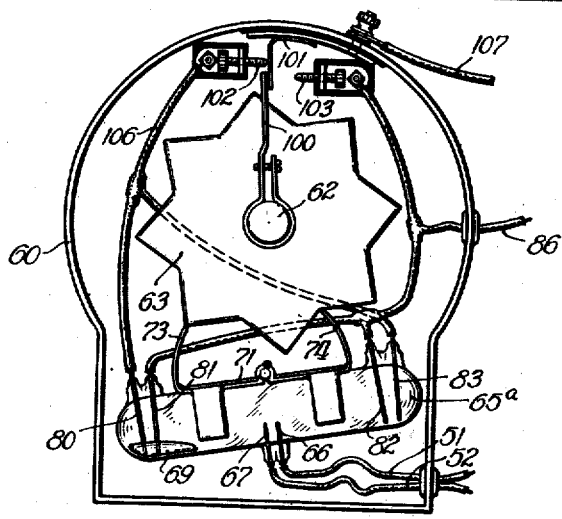

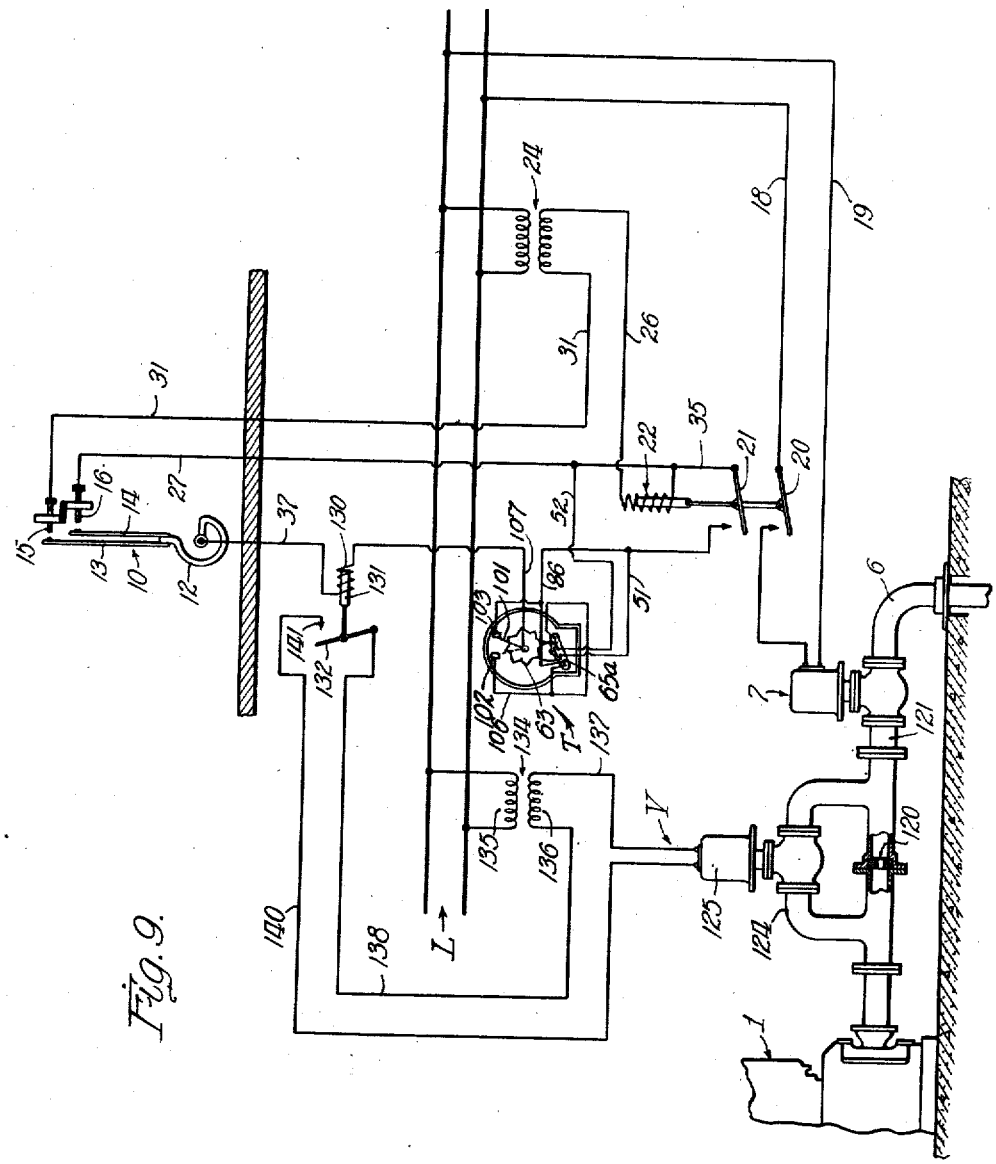

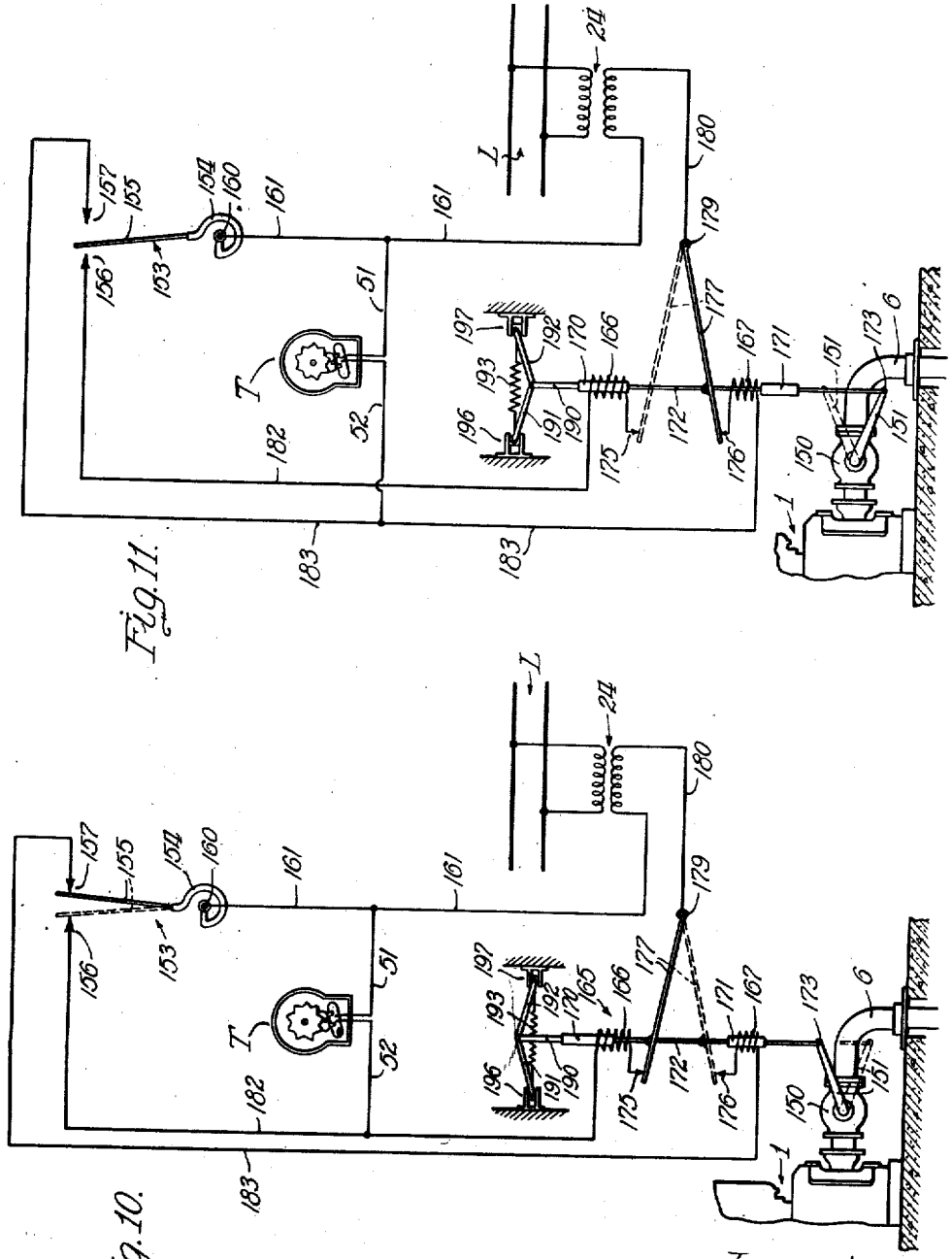

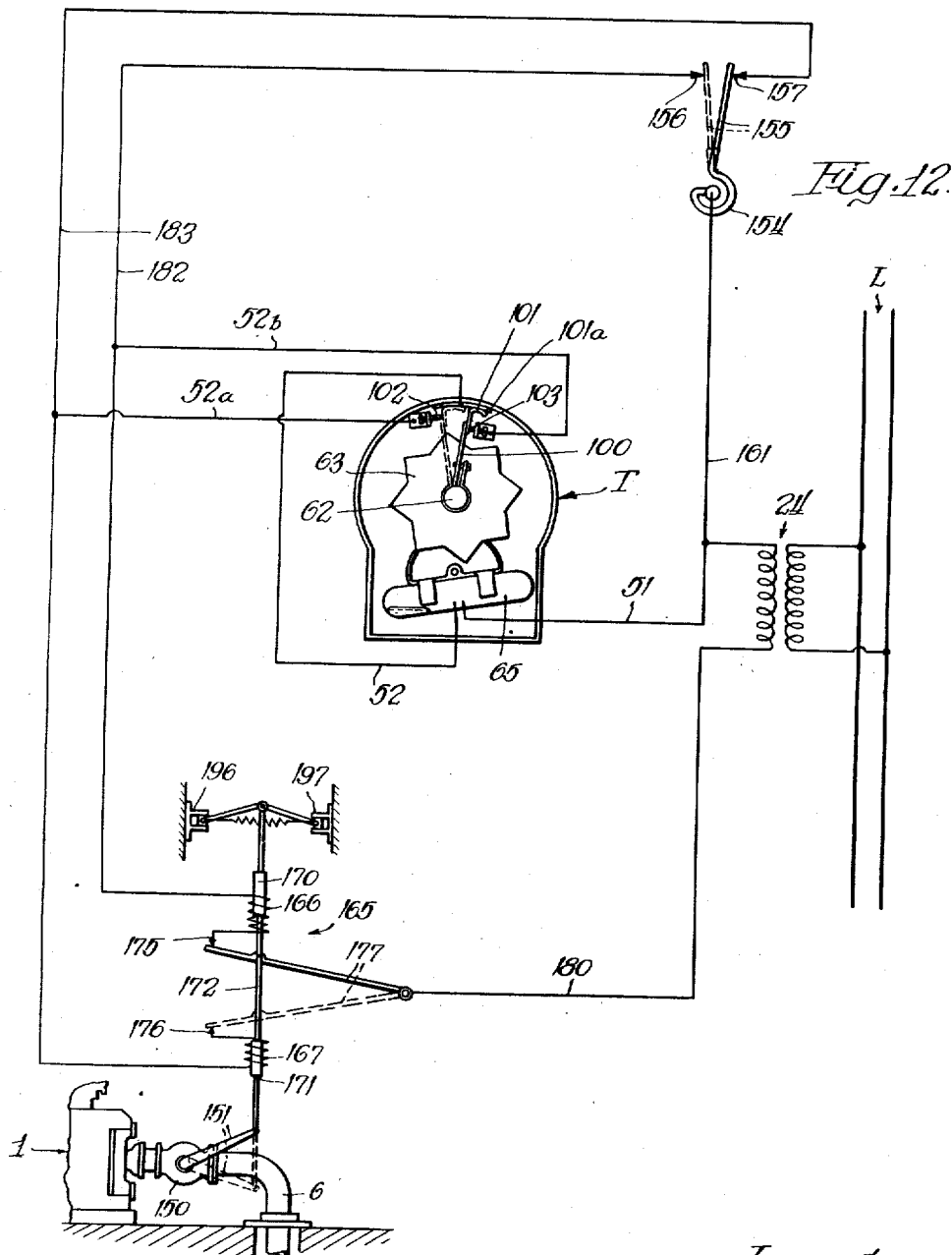

Patented Dec. 26, 1939

2,184,982

UNITED STATES PATENT OFFICE 2,184,982

CONTROL SYSTEM FOR HEATING

Earl L. Tornquist, Elmhurst, Ill.

Application July 5, 1934, Serial No. 733,799

17 Claims. (Cl. 236—9)

The present invention relates generally to control means for heating systems and the like and has for its principal purpose the provision of control means so constructed and arranged as to secure a greater degree of uniformity and comfort than hitherto has been possible, particularly in automatic systems, such as those fired by gas or oil.

There are a number of factors involved in the problem of securing uniformity of temperature and comfortable conditions when using automatic heating. To illustrate, when automatic heating such as with gas or oil is used in a hot water heating plant, for example, the intermittent firing of the boiler or furnace may cause the radiators to become warm for a period, then the radiators of the heating medium therein, may cool down to approximately room temperature for a time, even while the temperature of the room as registered by the thermostat is still at or above the thermostat setting, and then the next operation of the furnace will raise the temperature of the medium within the radiators to a point considerably above room temperature, producing relatively wide variations in the temperature of the heating medium.

In automatic heating, one of the most generally used controlling means embodies a thermostat situated in the room or the space to be heated and operatively connected with the boiler, furnace, or other source of heat, in such a way that when the room falls to a given temperature, say 70°, the source of heat is placed in operation, and when the room temperature increases to a point, slightly above the first temperature setting, say 72°, the furnace or burner is cut off. This difference of 2°, hereinafter termed a temperature differential, is desirable in order to prevent the constant starting up and shutting down of the heating plant. The heating means, under these conditions is thus arranged for intermittent operation, and consequently the temperature variations mentioned above are introduced into the heating medium, that is, the medium which transfers the heat from the burner or boiler or other heat source to the radiators or other heat dissipating means in the room, and these temperature variations frequently vary over a relatively wide range.

There is inherent lag in the operation of any thermostat, even in the instrument itself, and in such a system as referred to above, the wide variations mentioned above are accentuated by the inherent lag in the system. Consider a situation where the burner is started when the room temperature drops to 70° and is shut off when the room temperature has increased to 72°. During the time that the room temperature is thus increased 2°, from 70 to 72°, the water temperature of the heating medium, whatever they may be, may have fluctuated as much as 100° or, in some instances, as in the case of hot air systems, even more. At any rate, by the time the room temperature has increased the 2°, that is, to bring it up to 72°, a considerable quantity of heat has been transmitted to the heating medium, and this residual heat continues to be dissipated into the room, even though the thermostat has already shut off the burner. This residual dissipation of heat continues to raise the temperature of the room so that, actually, the temperature of the room may be increased to as much as 75° before this residual heat has been entirely dissipated and further heating of the room terminated. This condition is frequently termed overshooting or overrunning because of the tendency for additional quantities of heat to be poured into the room even after the cessation of operation of the heating means.

Similar conditions exist at the other end of the differential range. For example, as the room temperature falls from above 72° to 70° in the illustration assumed, by the time this occurs, and particularly by the time that the room temperature as registered by the thermostat reaches 70°, the temperature of the heating medium, by which heat is transmitted from the furnace or burner to the room, has decreased materially, in some cases to almost room temperature. Therefore, at the instant that the room thermostat reaches 70° and the burner is started, it is necessary for the burner or furnace to first raise the temperature of the heating medium from approximately room temperature to temperatures materially greater, depending upon the system, before any heat is actually sent out into the room. In a hot water system, the required temperature increase may be as much as 180°. This increase does not, of course, occur instantly but takes an appreciable length of time, and hence the room temperature may continue to fall below 70° and may thus swing downwardly to as low as 65° in some instances before any substantial quantity of heat is actually delivered into the room.

Accordingly, therefore, while the room thermostat is arranged to start the burner at 70° and shut the same off at 72°, the actual temperature of the room may vary as widely as from 65° to 75°. Such variations introduce uncomfortable conditions. A person in the room, say at 75°, becomes accustomed to that temperature and when the temperature swings downwardly through 70° to 65° the person feels uncomfortably cold. Actually due to such variations a person may feel uncomfortably cold at 70°. Furthermore, due to the fact that the burner is shut off at 70° and the temperature of the heating medium drops to approximately room temperature, appreciable time is required to raise the temperature of the heating medium and the air in the room may become stratified, that is, certain portions of the room may be much below 70°, even though the thermostat may be disposed in a layer of air having a temperature of 70° or above. This stratification of the air is due, at least in part, to a lack of circulation, and the lack of circulation is due, at least partly, to the fact that there is no heat in the radiator and therefore it does not promote the circulation of the air. This condition is apt to be prevalent in warm air heating systems, as well as in steam, hot water, and other heating systems.

With these factors in mind, the principal object of the present invention is to maintain the temperature of the heating medium within relatively narrow limits during the normal operation of the heating plant, as by starting or stopping, or otherwise increasing or decreasing the effectiveness of the operation of the burner independently of the room thermostat and even within the range of the temperature differential for which the thermostat is adjusted. By virtue of such means, a much more sensitive type of control is secured than hitherto possible. According to the present invention, however, the thermostat does not at any time lose control of the operation of the burner or other heating means.

Another object of the present invention is the provision of means for controlling heating systems whereby the ordinary thermostatic control is augmented by a separate control which, while it does not displace or interfere with the thermostatic control, serves to maintain the room temperature within narrow limits at approximately the lower setting of the thermostat. Still further, another object of the present invention is the provision of separate control means which serves to maintain the room temperature within narrow limits at approximately the higher thermostat setting, and, still further, another object of the present invention is the provision of means which combines these two controls, one of which is preferably arranged for operation during periods of descending temperatures and another arranged for operation during periods of ascending temperatures. Specifically, it is an object of the present invention in this connection to arrange said one means for operation during the time that the temperature of the heating medium is descending and the other means when the temperature of the heating medium is ascending. Thus, when the temperature of the heating medium is descending, if the control is so performed as to maintain the temperature of the room at nearly the upper or higher limit of the thermostat setting, the tendency for the temperature of the heating medium to swing downwardly too far is eliminated, and, similarly, where the control is effected by the ascending temperature of the heating medium, the feature of holding the room temperature at a point adjacent the lower thermostat setting prevents the overshooting of the temperature of the heating medium.

It will be apparent, of course, that all of these factors contribute to the maintenance of substantially uniform temperatures in the room or other space to be heated.

A further object of the present invention is the provision of a combination control in which the higher heat requirements are met by an arrangement wherein the control generally operates on the descending principle and in which the lower heat requirements are met by the control generally operating only on the ascending principle.

Another object of the present invention is the provision of means for periodically modifying a room temperature responsive control according to fixed temperature increment or decrement of the heating medium by which heat is transferred from the heat source to the space to be heated. The use of a periodical control based on a fixed temperature change in the heating medium automatically adjusts the system for most efficient operation at the rate of heat dissipation under which the heating plant is operating.

An additional object of the present invention is to control a heating system by an auxiliary control which throttles but does not cut off the heat source entirely or start the same up fully, whereby changes in the heat demand are, in effect, anticipated so that a more nearly uniform temperature is maintained at all times.

These and other objects and advantages of the present invention will be apparent to those skilled in the art after a consideration of the following detailed description of the preferred arrangements, taken in conjunction with the accompanying drawings.

In the drawings:

Figures 2 and 3 illustrate different positions of the room thermostat;

Figure 4 is a perspective view of the heating medium thermostat which is responsive to the temperature of the heating medium, as distinguished from the temperature in the room, and which is adapted to momentarily complete a circuit every time the temperature of the heating medium increases or decreases a given amount;

Figure 5 is a modified form of the present invention in which the room temperature is maintained at or near the lower differential of the room thermostat;

Figure 6 illustrates the switch device used with the heating medium thermostat in the circuits when arranged as shown in Figure 5;

Figures 7 and 8 show the circuits and heating medium thermostat when arranged to operate on the ascending and descending principles in combination;

Figure 9 is another modification of the present invention and illustrates means for securing a throttled action of the heat source so long as the room temperature is within the differential limits of the room thermostat;

Figures 10 and 11 are other modifications showing the use of the present invention in circuits involving two-position controls; and Figure 12 shows the circuit of Figures 10 and 11 when equipped with a combined control.

Figure 1:
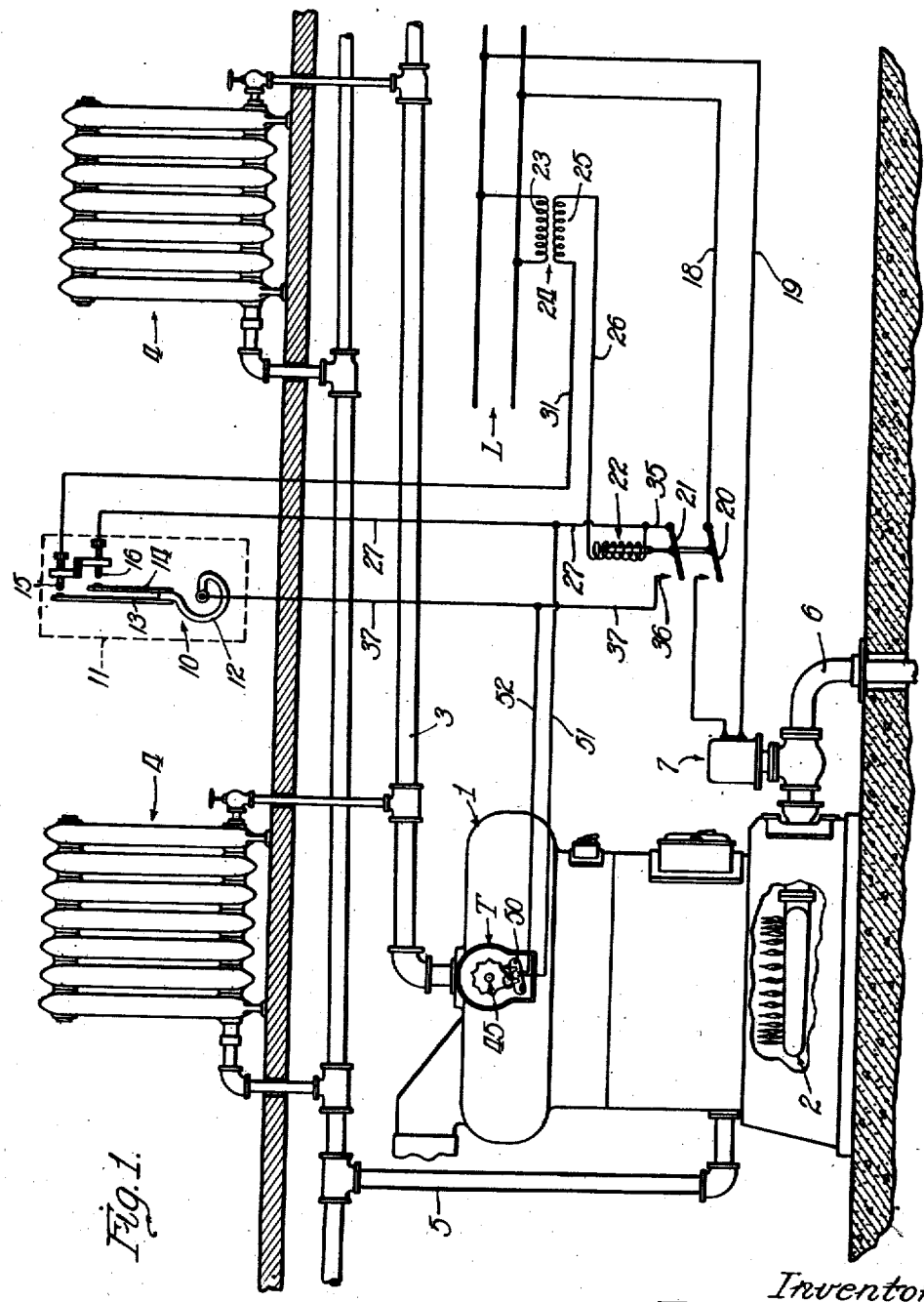
Figure 1 is a diagrammatic view showing a heating plant with a controlling room thermostat in connection with circuits and control devices embodying the principles of the present invention and acting to maintain the room temperature at or near the upper differential limit of the room thermostat.

There are a number of well known systems for controlling the operation of burners, gas or oil, stoker or other means employed in automatic heating plants for the proper thermostatic control of the furnace or other source of heat, and for illustrating the principles of the present invention I have adopted a construction embodying a hot water furnace 1 fired by a gas burner 2 and arranged to contain a heating medium, such as water, which is directed through a supply main 3 to the radiators 4 in the room or rooms to be heated. The cool water from the radiating system, represented by the radiators 4, is directed back to the heater 1 through a return pipe 5. The gas burner 2 is supplied by gas from a supply conduit 6 controlled by a gas valve 7 of any desired construction. Preferably, however, the gas valve 7 is arranged to be controlled by an electric circuit, and one well known type of gas valve which may be installed in the construction illustrated includes an electric motor which is arranged to open the valve controlling the supply of gas through a train of gears. The motor operates on the stall principle, that is, the motor opens the valve until the latter reaches its fully open position and then further movement of the valve is prevented, thereby stalling motor. The valve then remains open until the circuit to the motor is broken, at which time the valve is closed by a spring or the equivalent, the motor and the train of gears being driven back to closed position by such spring. Such gas valves are well known in the art and the details per se form no part of the present invention. Any form of valve may be used if desired, such as valves of the solenoid or magnetic type. Electrically controlled throttle valves and regulators may also be used where desirable for reducing or increasing the gas flow without actually shutting off all flow, as will be referred to later.

Also, it is to be further understood that the present invention is not necessarily limited to a hot water heater but may be employed on any heating system in which a source of heat utilizing any form of fuel available is arranged to heat a medium which is adapted to be directed to the room or space to be heated in which some form of radiating system, utilizing the heat of said medium, is disposed. In such case, the device 7 represents any known form of means for controlling the heat source, and in case the furnace 1 is fired by a solid fuel, such as coal or the like, the device 7 represents any known device for controlling the damper or any mechanism by which the rate of feed, as by a stoker, is controlled.

One means for controlling the burner or heat source of an automatic heating system which has proven satisfactory in service is one in which the control device 7 is under the control of a thermostat located in the room or space to be heated and arranged to start the operation of the heating plant when the room temperature has fallen to a given point and arranged to stop the operation when the temperature of the room as registered by the thermostat has reached a second given point. Thus, the furnace, boiler or the like, is intermittently operated for such lengths of time that the radiating system acts to keep the temperature of the room or other space fairly constant. Preferably, however, the thermostat is arranged with a given temperature differential, that is, the thermostat closes certain contacts at one temperature to start the burner and opens such contacts or other contacts at a slightly higher temperature to stop the operation of the burner, the difference between these two points being known as the temperature differential of the thermostat and is desirable so that the temperature of the room can vary within the range of the temperature differential, without having the thermostat constantly making and breaking the connections, or the burner being constantly started and stopped at relatively short intervals.

As mentioned above, there is a considerable lag in the responsiveness of such a system. Between the time that the burner is started and the time that the temperature of the room has been raised to a point that the thermostat moves to stop the operation of the burner, a considerable quantity of heat has been transferred into the heating system so that the temperature of the room tends to rise above the upper limit of the temperature differential of the thermostat, even after the burner or other heat source has been shut off or reduced. Similarly, after the burner has been shut off the heating system cools down, so that there is a considerable lag between the time when the thermostat subsequently calls for more heat and the time when the room begins to be heated, for the burner must operate for some time in order to first raise the temperature of the heating medium from room temperature up to its effective heating temperature. The result of this arrangement is that, actually, the temperature of the room falls to a considerable point below the lower limit of the differential of the thermostat before heat is sent up to the room, and likewise the temperature of the room rises above the upper differential limit before the heat is cut off.

In the drawings, the reference numeral 10 indicates one type of thermostat which is in use at the present time and which embodies an ornamental casing 11 or the like in which is disposed a temperature responsive coil 12 carrying two contact blades 13 and 14. These contact blades 13 and 14 are electrically connected together and to the thermostat coil 12 and are arranged to engage, respectively, contact points 15 and 16.

The thermostat is adjustable for securing various temperatures in the room or other space to be heated and, likewise, the temperature differential may be any desired quantity. The details of the thermostat itself form no part of the present invention, but for purposes of illustration the thermostat 10 is shown as arranged to control the furnace 1 with a temperature differential of approximately 2°, and preferably the burner is started when the room temperature reaches 70° and is shut off when the room temperature reaches 72°. This may, of course, vary.

Figure 1 illustrates the relation between the contact blades 13 and 14 and associated contacts 15 and 16 when the temperature is above 72°. Figure 2 represents the position of the parts when the room temperature is at 72°, and Figure 3 represents the position of the parts when the room temperature is at 70° or below. It will be noted from Figure 2 that at 72° the thermostat blade 13 engages its contact 15 while the other thermostat blade 14 does not engage its contact 16 until the room temperature has fallen to approximately 70°, which is the position shown in Figure 3. Preferably, the thermostat blade 13 is flexible to accommodate this operation.

Referring now to Figure 1, it will be observed that the gas valve 7, which represents any known means for controlling the starting and stopping or other means for increasing and decreasing the effectiveness of the heat source, is energized by conductors 18 and 19 from the line L, the conductor 18 including a line switch 20. The line switch 20 is mechanically interconnected with a holding switch 21, as by being associated with the plunger of a relay coil 22 in any well known manner.

Connected across the line L is the primary 23 of a transformer 24, and one end of the secondary 25 of the transformer is connected by a lead 26 with the relay coil 22. The other end of the relay coil 22 is connected by a lead 27 with the contact 16, and the other end of the secondary 25, opposite the end to which the conductor 26 is connected, is connected by means of a lead 31 with the contact 15.

From the construction so far described, it will be observed that when the thermostat switch blades 13 and 14 have been moved to the position shown in Figure 3, corresponding to a room temperature of 70° or lower, a circuit is established from one side of the secondary through the conductor 26, the relay coil 22, the contact 16, the switch blades 14 and 13, the contact 15, and back through the lead 31 to the other side of the secondary 25 of the transformer 24. This energizes the relay coil 22 and causes the same to pull up the switch 20, thus closing the line circuit to the burner control device 7 and causing the same to open the valve so that gas will flow to the burner 2, at the same time igniting the same by any suitable means well known in the art, such as by a pilot light. At the same time that the relay 22 pulls up the switch 20, the switch 21 is also closed, and the switch 21 is connected, through a short lead 35, with the same end of the relay coil 22 to which the conductor 27 is connected. The contact engaged by the switch 21 when it is closed by the operation of the relay coil 22 is indicated by the reference numeral 36, and this contact is connected by means of a conductor 37 with the thermostatic coil 12.

As a result of this construction, as long as the relay coil 22 is energized the line switch 20 is kept closed which, in turn, drives the motor of the gas valve 6 into its stalled position and holds the motor in this position, thus maintaining the gas valve open until a time when the relay coil 22 is deenergized which then permits the switches 20 and 21 to open. However, as soon as the relay coil 22 is energized in the first place, the closing of the switch 21 serves to establish a circuit from one side of the relay coil 22 through the switch 21, the conductor 37, the thermostatic coil 12, the thermostat blade 13, the contact 15, and the conductor 31 with the secondary 25 to which the other end of the relay coil 22 is connected, as through the conductor 26. There is thus established a holding circuit which maintains the relay coil 22 energized, even though the thermostat should uncoil to the extent of moving the thermostat blade 14 away from contact 16 (the position shown in Figure 2), thus breaking the circuit at this point but maintaining the relay coil energized by the circuit through the closed switch 21, conductor 37 and the coil 12 and switch blade 13.

Maintaining the burner 2 in operation delivers heat to the heating medium circulating through the radiating system 3—5, and this, in turn, delivers heat to the room or space to be heated and thus raises the temperature thereof. As the temperature rises the thermostatic coil 12 uncoils and, at approximately 72° in most installations, both thermostat blades 13 and 14 are separated from their contacts 15 and 16. As soon as the connection is broken at 13—15, the holding circuit through the conductor 37 is interrupted and the relay coil 22 is no longer energized. This permits both switches 20 and 21 to open, thus shutting off the burner 2 and disconnecting the holding circuit which maintained the relay 22 in energized relation after the connection has originally been interrupted at 14—16.

Except by means which is to be described later and which forms a part of the present invention, current cannot be reestablished through the relay coil 22 by the means described above to start the burner again until the room has cooled down sufficiently to cause the thermostat 12 to contract and to close both thermostat blades 13 and 14 against their respective contacts 15 and 16, which in most installations is not attained until the temperature in the room as registered by the thermostat has fallen to 70°. So far as the present invention is concerned, the means described above is old and well known and the details thereof per se do not form any part of the present invention except as an element in the novel combination. From the above description it will be apparent that the gas valve 7 will be opened to start the burner 2 whenever the temperature in the room drops to 70° to close the relay circuit through the engagement of the switch blades 13 and 14 and the respective contacts 15 and 16, and it will also be observed that the burner 2 is maintained in operation until the temperature in the room has reached 72° at which time the holding circuit through the conductor 37 is broken by the separation of the thermostat blade 13 from its contact 15. Maintaining the burner in operation in this manner until the room thermostat registers a temperature of 72° tends to cause the overshooting or overrunning mentioned above, that is, the temperature of the heating medium in the burner 1 and the supply main is raised to such a point that there is a considerable quantity of residual heat which continues to be transmitted into the radiating system 4 so that the temperature of the room continues to rise for a period of time to a point about 72°, even though the burner has already been cut off. Similarly, when the temperature in the room has fallen to 70°, the point at which the burner 2 is started up, the temperature of the heating medium, by which heat is transferred from the thermostat to the rooms, may have fallen to almost room temperature. Thus, there is a period of time during which, even though the burner 2 is in operation, no heat is yet sent up to the rooms, and hence the temperature of the latter continues to fall below the lower limit, namely 70°, of the temperature differential. In one form of the present invention, these undesirable swings or variations are eliminated by means which, when arranged as shown in Figure 1, operates to start the burner 2 after the temperature in the room has dropped to 72°, or after the temperature falls to such a point that the thermostat coil 12 moves the contact 13 back into engagement with the contact 15, even though the blade 14 has not been moved into engagement with the contact 16, a necessity for starting up the burner according to the prior art.

One means which I have provided for starting up the burner when the temperature of the room has fallen to 72° is shown in Figure 1, and, in general, constitutes a shunt circuit around the switch 21 and is operative, in series with the contacts 13—15, to close the line switch 20 by means which is dependent upon two interrelated factors, namely room temperature and temperature of the heating medium itself. This means constitutes, with other modifications, the principal part of the present invention and includes a thermostat device indicated in its entirety by the reference character T which comprises, in general, a thermostat 45 controlling a switch 50 which, through leads 51 and 52 connected, respectively, with the conductors 27 and 37, serves to temporarily short-circuit the switch 21 and, if a connection is established at the contacts 13 and 15, to thereby close or complete the circuit from the secondary of the transformer 24 through the relay coil 22, the lower portion of conductor 27, the leads 51 and 52 and the switch 50, the upper portion of the conductor 37, the thermostatic coil 12, the contacts 13 and 15, and the conductor 31. Since the contacts 13 and 15 are not closed unless the room temperature is at or below 72° it will be noted that the closing of the switch 50 will have no effect as far as energizing the relay 22 is concerned unless the connection is completed at 13, 15, but if these latter contacts are in engagement, then as soon as the room temperature drops to 72° and as soon as the temperature of the heating medium is such that the switch 50 connects the conductors 51 and 52, the relay 22 is energized without waiting for the room temperature to drop to 70°, which would close the contacts 14 and 16, as would be necessary if the circuits were operated according to the prior art.

The device T, illustrated somewhat diagrammatically in Figure 1, is shown more in detail in Figure 4 and includes a supporting plate or housing 60 to which one end of the thermostatic coil 45 is connected. The other end of the coil 45 is connected, as at 61, with a thermostat shaft 62 journaled for rocking movement in the housing 60, as is usual in this type of instrument. The outer end of the thermostat shaft 62 carries a notched segment 63 adjacent which is pivotally mounted, as at 64, a mercury switch tube 65 which constitutes the principal movable portion of the temperature responsive switch 50. The electrodes 66 and 67 are disposed adjacent one another in the central portion of the mercury tube 65 and the conductors 51 and 52 are connected thereto so as to be closed by a globule of mercury 69 which is disposed within the mercury tube 65.

The notched segment 63 cooperates with an escapement member 71 carried by and movable with the mercury switch tube 65 and has pallet portions 73 and 74 spaced, as indicated in Figure 4, so that as the segment or plate 63 is rocked under the action of the thermostat coil 45, the mercury tube 65 will be tilted back and forth about its axis 64 causing the mercury 69 to momentarly connect the contacts 66 and 67 every time that the temperature of the heating med'um changes enough to swing the plate 63 through half the distance between notches. Obviously, other means may be provided for tilting the mercury tube 65 in accordance with temperature changes in the thermostat coil 45.

As indicated in Figure 1, the device T is placed on the upper part of the heater 1 with the thermostat co'l 45 disposed in thermal relation with the heating medium, either by being placed therein or by being disposed against the side of the heater, as in the case of contact thermostats. The device T may also be placed somewhere in the supply line 3 containing the heating medium by which the heat is transferred from the burner to the radiating system in the room or rooms. As the temperature of the heating medium changes, the notched segment 63 is swung in one direction or the other, and each time a notch passes one of the pallet portions 73 and 74 the mercury switch tube 65 is swung from one position to another, and each time the mercury tube 65 is operated, the globule of mercury 69 passes the electrodes 66 and 67 and temporarily short-circuits the same to energize the relay coil 22 if the room temperature is such that the contacts 13 and 15 are engaged.

For hot water heating systems, the segment 63 is preferably arranged so that the electrodes 66 and 67 are electrically connected together momentarily for every fifteen degrees change in the temperature of the heating medium, but obviously, of course, this thermal periodicity may be greater or less if desired and depends upon the particular type of heating system with which the present control means is associated. For example, in hot air heating systems, the period desired may be in the neighborhood of thirty-five degrees, more or less.

The operation of the mechanism described above with the device T embodied in the circuits as indicated in Figure 1, is substantially as follows:

Assuming, first, that the temperature of the room has fallen to a point below the lower limit of the thermostat differential, which lower limit is generally, but not necessarily, in the neighborhood of 70° F., the thermostat coil 12 will have swung the contacts 13 and 14 to the position shown in Figure 3, and this will have established a circuit from the secondary of the transformer 24 through the relay coil 22 as described above, thus closing the switches 20 and 21, the switch 20 serving to open the gas valve 7 and start the burner 22. Now as the temperature of the heating medium increases, the medium will be caused to flow through the radiating system 4 and heat the room, returning to the furnace 1 by way of the return pipe 5. As the temperature of the heating medium increases, the coil 45 will be actuated to rock the segment 63, swinging the mercury switch tube 65 from one side to the other at every fifteen degrees of increase, or approximately so, but this will have no effect on the system because the initial operation of the relay coil 22 serves to close the switch 21 and maintain the relay coil 22 in energized relation so long as the connection at 13 and 15 remains in engagement. However, as sooon as the room temperature exceeds the upper differential limit, 72° F. in the assumed setting, the connection is broken at 13 and 15 and the relay coil 22 is de-energized, thus interrupting the connections to the gas valve 7 and allowing the same to shut off the gas supply to the burner 2. Although the burner is now shut off, there is a quantity of residual heat in the system so that the temperature of the room may, for a time, remain above the upper differential limit 72°. However, as soon as the burner 2 is shut off, the temperature of the heating medium falls, and, likewise, the segment 63 will now be swung in the opposite direction under the action of the cooling off of the thermostat coil 45 disposed in thermal relation with respect to the heating medium, as indicated in Figure 1. For every fifteen degrees during the lowering of the temperature of the heating medium, the mercury globule 69 will temporarily short across the electrodes 66 and 67, but so long as the room temperature is still above the differential limit of the thermostat, namely, 72°, there will be no electric circuit completed through the relay coil 22, and therefore the burner will not come on. However, when the room temperature has descended to 72°, or slightly lower, the contacts 13 and 15 will be in engagement, and as soon as the temperature of the heating medium has cooled sufficient to once more operate the mercury tube 65 the shorting of the electrodes 66 and 67 by the mercury globule 69 will serve to connect the conductors 51 and 52 and a circuit will at once be completed from the secondary of the transformer 24 through the relay coil 22, the lower portion of conductor 27, the conductors 51 and 52, the thermostat contacts 13 and 15, and the lead 31. The burner will therefore be brought into operation again and will then remain in operation until the room temperature has reached the upper differential range of the thermostat and will again be shut down by the separation of the contacts 13 and 15, until the cooling of the heating medium, actuating the thermostat 45, and the cooling of the room temperature down to 72° will again establish a circuit through the relay coil 22 and again bring the burner into operation.

From the above described operation, it will be noted that as the temperature of the heating medium decreases, the electrodes 66 and 67 will be closed at definite intervals, and if the room temperature has decreased even slightly from the upper differential range of the thermostat, namely, 72° under the conditions assumed, the burner will come on and will bring the room temperature back to this setting before the burner will again be shut off. The result of this arrangement is to prevent the extreme swings in the temperature of the heating medium which commonly follow the operation of a control arrangement wherein the temperature of the room must descend to the lower differential limit before the burner can again be brought into operation. With the control performed according to the principles of the present invention, there will be less stratification of the air, partly because of the maintenance of some circulation by preventing the heating medium from becoming cold, and also there will be a more constant temperature in the room and a more comfortable general heating condition. As will be obvious, the above described system tends to keep the temperature of the room at or near the upper differential limit of the thermostat and is operative principally during periods of descending temperatures of the room and of the heating medium. The above described arrangement may therefore be designated as an application of the principles of the present invention to descending temperatures.

To utilize the principles of the present invention by applying the same to the control of the burner on ascending temperatures, substantially the only change required in the circuits shown in Figure 1 is to arrange the device T in series with the holding switch 21, instead of in parallel as shown in Figure 1, and to arrange the mercury switch tube 65 so that the circuit through the associated leads is momentarily broken, instead of being momentarily established as indicated in Figures 1 and 4. Figure 6 illustrates the mercury switch tube of the second thermostat device T arranged for utilization in a circuit operating on the principles of ascending temperatures, and it will be observed that, instead of having two electrodes in the central portion of the mercury switch tube 65, two pairs of electrodes are utilized, two electrodes being at each end of the tube. The reference numerals 80 and 81 indicate one pair of electrodes at one end of the tube, and the reference numerals 82 and 83 indicate the other pair of electrodes.

Figure 5 shows a form of circuit which may be employed when my control means is arranged for ascending temperatures. The electrodes 80 and 83 are electrically connected together and to a conductor 85, and the other electrodes, 81 and 82, are also electrically connected together and to a conductor 86. Referring now to Figure 5 in which the circuit for this arrangement has been indicated, it will be observed that the contact 36, which is adapted to be engaged by the switch 21 when the latter is closed by the energization of the relay coil 22, is connected, not with the conductor 37 as indicated in Figure 1, but with the conductor 86 leading to one set of the electrodes, 81 and 82. In Figure 5 the lower portion of the conductor 37, which is connected with the thermostat coil 12 and which, in Figure 1, was connected with the contact 36, is now connected in Figure 5 with the conductor 85. This arrangement disposes the thermostat device T in series with the holding switch 21. The other circuits are the same as indicated in Figure 1 and the operation of the circuits shown in Figure 5 is substantially as follows.

When under the conditions assumed above, the temperature of the room is above 72°, or below 70°, that is, outside the temperature differential range of the thermostat 10, the burner is started or stopped by the action of the thermostat 10 in the usual manner and the making or breaking of the connection between conductors 85 and 86 has no effect whatsoever. That is to say, if the temperature is below 70°, the relay coil 22 is energized by the closing of the contacts 14 and 16 and the contacts 13 and 15, and if the temperature is above 72°, the upper differential limit, the relay coil 22 is not energized because the connection is broken at the contacts 13 and 15, regardless of the position of the thermostat device T.

Assuming, now, that the burner was started by the temperature of the room falling below 70° closing the contacts 13—15 and 14—16, and has operated sufficiently to bring the temperature of the room to a point within the differential range of the thermostat 10, that is, between 70° and 72°, the contacts 13 and 15 will be in engagement but the contacts 14 and 16 will not be engaged. Normally, however, the relay coil 22 will remain energized by a completion of the circuit from the secondary of the transformer 25 through contacts 13 and 15 and either the contacts 80 and 81 or the contacts 82 and 83 of the second thermostat T and through the switch 21 which was closed by the initial energization of the relay coil 22. However, as the burner is maintained in operation and the temperature of the heating medium increases, the thermostat device T will operate to momentarily break the connection between the conductors 85 and 86, by swinging the mercury switch tube from one side to another and by thus causing the mercury globule to leave the two electrodes which it had previously served to connect. The purpose of momentarily breaking the circuit at this point is to shut down the burner if the room temperature has increased to some point adjacent or slightly above the lower differential limit of the thermostat so that the contacts 14 and 16 are separated, for the contacts of the device T and the switch 21 are in series and the moment the contacts 14 and 16 are separated, the relay coil 22 is deenergized and the switch 21 immediately opened. Since the switch 21 is then opened the subsequent connection of the other pair of contacts in the mercury switch tube 65 as the latter completes its swing, will have no effect. Therefore, the burner will be shut down and will stay shut down until the temperature of the room has dropped to or below the lower temperature differential of the thermostat, namely 70°, at which time the thermostat 12 will then cause the contact 14 to engage the contact 16 and therefore will establish a circuit through the relay coil 22 in the usual manner. This will then close the switches 20 and 21 and the burner will stay on until the contacts 14 and 16 separate and the rising temperature of the heating medium causes the second thermostate device T to momentarily break the connection between the conductors 85 and 86, whereupon the burner will again be shut down until the temperature in the room falls to the lower differential limit.

The action of this method is, therefore, the reverse of the arrangement previously described above in that, where before the tendency for the arrangement was to cause the room temperature to be maintained at the upper differential limit, the present arrangement is such that the tendency is to maintain the temperature of the room at the lower differential limit. This is accomplished by preventing the temperature of the heating medium from rising above the temperature that is necessary for the heating requirement, for as soon as the room temperature is brought up to the lower differential limit, a slight increase in the temperature of the heating medium, an increase of 15° where the heating medium is water under the conditions assumed, will cause the burner to be shut off.

One of the advantages of the ascending principle is that the system is not disturbed by jars, such as those caused by passing street cars, a person walking across the room, etc., or by sudden changes of temperature, as by opening a door, which under the descending principle may cause the burner to be shut off at short intervals. On the other hand, under the ascending principle the room temperature is maintained at approximately 70 degrees, the lower differential limit, and this keeps the switch blade 13 in firm engagement with the contact 15, for even when the blade 14 is just about to leave the contact 16, the blade 13 is still under appreciable tension acting to hold it more or less firmly against the contact 15 (see Figure 3). Therefore, irrespective of whether or not the thermostat blade 14 momentarily leaves its contact 16, as by being jarred, the burner is maintained in operation and jarring will not affect the same because of the biased condition of the switch blade 13 and the mercury connection at the device T (Figure 5) between the conductors 85 and 86. However, at every thermal period (15° as assumed above) the device T serves to break the circuit unless the switch blade 14 is already out of engagement with the contact 16, so that whatever fluttering or jarring there may occur will have no effect unless exactly at the moment that the mercury is moving from one end to the mercury tube to the other, but as is obvious, this is not likely to occur at all and, at most, can continue for only a very small fraction of time and, hence, can be ignored.

Another advantage of the ascending principle is that at the higher heat demands the burner is kept on for longer periods of time, because, to raise the water temperature the fixed amount, 15° as assumed, requires much more time when the water temperature is relatively high to begin with than when the water temperature is lower. There may actually be times when the furnace is operated near its maximum and the water temperature does not change as much as 15°. Where the time interval between the 15° changes is thus increased, the tendency is to maintain the room temperature at a greater average than obtains when the weather is milder and the water temperature is somewhat lower. Accordingly, therefore, a system constructed according to the principles of the present invention operates at certain thermal periods, depending upon fixed temperature changes in the heating medium, to automatically readjust itself to efficiently accommodate the demands to which it is subjected.

From the above description of the two arrangements, it becomes apparent that each has its advantages and that, in each arrangement, there is provided two thermostats, one responsive to the temperature of the room for starting up the burner when the room temperature falls below a certain temperature and for shutting off the burner when the room temperature exceeds a given temperature, regardless of the condition of the second thermostat.

It is also observed that in both cases the second thermostat T is, first, operative only when the room temperature is within the temperature differential of the thermostat setting and, second, it is responsive to the temperature of the heating medium and controls the burner circuits in such a manner that the room temperature is kept practically constant and does not swing upwardly or downwardly appreciably above or below the temperature differential of the thermostat. Nevertheless, the room thermostat is at all times maintained in normal control of the burner, for in any position of the device T the burner is shut off when both switch blades 13 and 14 are open and the burner is started up when both blades 13 and 14 engage the contacts 15 and 16.

Reference is made above to the fact that the arrangement shown in Figure 1 is such that as the temperatures descend, the room temperature is prevented from swinging downwardly too far by starting up the burner just as soon as the descending temperature of the room reaches the upper thermostat differential, and in the second arrangement described above it was set forth that during periods of ascending temperatures, the temperature of the room was prevented from overrunning or swinging upwardly too far by shutting off the burner just as soon as the room temperature had been brought up to the lower differential limit. These two principles of operation are particularly adapted to be combined in a single control arrangement and is especially efficacious in preventing large temperature overruns or excessive temperature lags for if, as the temperature of the heating medium tends to swing downwardly, the burner is started up at the upper differential limit and as the temperature tends to swing upwardly the burner is shut off at the lower differential limit, the net result is that as long as the room temperature is substantially within the differential limits of the room thermostat the temperature of the heating means remains about the same and, in effect, the heating plant control floats between the two systems.

One arrangement for combining both the ascending and descending principles in the same system is shown in Figures 7 and 8 which illustrate means tending to prevent the temperature of the heating medium from exceeding that to bring the temperature of the room up to the proper point and, at the same time, is operative to turn the burner on, even when the temperature of the room is within the differential range of the thermostat in order to prevent the room temperature from falling too low so as to be carried below the lower differential limit before the burner can be started up and made effective to send up heat to the room.

One means for accomplishing this result takes the form of a construction wherein a mercury switch tube embodies the connections shown in Figure 4 and, in addition, the connections shown in Figure 6, together with a changeover switch blade frictionally associated with the plate 63 and moved, in accordance with temperature changes in the heating medium, from one position to another, one position cutting in circuits so that the thermostat device T is arranged in series with respect to the holding switch 21, as shown in Figure 5, and the other position cutting in circuits to arrange the thermostat device T for operation in parallel with respect to the holding switch 21, as shown in Figure 1. A thermostat device built along these principles is illustrated in Figure 8 in which the shaft 62 of the thermostat coil 45 carries the plate 63 and a movable switch blade 100 which is frictionally disposed around the shaft 62 and carries a contact 101 with which stationary contacts 102 and 103 are associated. Preferably, such contacts are mounted on the casing or panel 60. A mercury switch tube 65a, pivotally mounted in the same manner as the tube 65 shown in Figure 4, carries not only the electrodes 66 and 67 shown in Figure 4, but also the pairs of electrodes 80—83 shown in Figure 6. The electrodes 80 and 83 are connected by means of a lead 106 to the contact point 102 while the lead 86 for the electrodes 81 and 82 is connected to the lower portion 37a of the conductor 37 leading to the contact 36 of the holding switch 21, as best shown in Figure 7 which is similar to Figures 1 and 5 and illustrates the circuits involved. As also best shown in Figures 7 and 8, the changeover switch blade contact 101 is connected by means of a conductor 107 to the upper portion of the conductor 37 which is connected with the thermostat coil 12.

From Figure 8 it will be observed that the changeover switch blade 100 frictionally engages the thermostat shaft 62, and hence whenever the plate 63 is swung in one direction, as by an ascending temperature of the heating medium, the contact 101 is swung in the same direction until it engages one of the contacts 102 and 103, and when the plate 63 is swung in the other direction, as by a descending temperature of the heating medium, the contact 101 is swung against the other of the contacts 102 and 103. Figure 7 best illustrates the circuits thus cut in and cut out by the movement of the changeover switch 100.

Referring now to Figure 7, when a change in temperature of the heating medium has swung the plate 63 to a position to cause the contact 101 to engage the contact 102, the operation of the circuits is the same as for the circuits shown in Figure 5. That is, assuming that the room temperature had previously fallen to below 70° so that the relay coil 22 was energized by closing the circuit at contacts 15 and 16, then the holding circuit for maintaining the switches 20 and 21 closed, even after the room temperature has exceeded 70° and the contacts at 16 opened, is completed as follows from the secondary of the transformer 24 through conductor 31, contacts 15 and 13, thermostat coil 12, the upper portion of conductor 37, conductor 107, changeover switch blade contact 101, contact 102, lead 106, the globule of mercury in one end of the switch tube 65a, conductor 86, the lower portion 37a of conductor 37, contact 36, switch 21, relay coil 22, and conductor 26, back to the secondary 25 of the transformer 24. However, as the burner 2 is maintained in operation by the relay coil 22 holding the line switch 20 closed and as the temperature of the heating medium ascends, the swinging movement of the notched plate 63 will cause the mercury switch tube 65a to swing in a clockwise direction, as viewed in Figures 7 and 8, thus interrupting the holding circuit through the relay coil 22 when the globule of mercury leaves the left hand end of the tube and the electrodes 80 and 81 connected by the globule in that position. This will cause the relay coil 22 to be deenergized, thus opening the switches 20 and 21, unless, of course, the room temperature is 70° or less and the contacts 14 and 16 are in engagement. If the room temperature is above 70°, the burner 2 will not come on again until the room temperature coasts down to 70° and the contacts 14 and 16 closed. When this does occur the relay coil 22 is energized in the usual way. Thus, during ascending temperatures the arrangement shown in Figure 8 serves to tend to hold the room temperatures at the lower differential so as to prevent overrunning in the upward direction.

It will be observed, however, that under the conditions just assumed, as the globule of mercury shifts from the left hand end of the mercury switch tube 65a to the right hand end thereof, the holding circuit, while momentarily broken, is immediately reestablished by the globule of mercury connecting the two electrodes at that end of the tube. However, this does not energize the relay coil 22 because the momentary interruption has already caused the switches 20 and 21 to open, and since the switch 21 is then open, the circuit cannot be completed, even though the two electrodes at the right hand end of the mercury switch tube are connected by the mercury globule 69. As the temperature of the heating medium continues to rise, every 15°, or whatever the thermal period chosen may be, the mercury switch tube 65a will be oscillated, momentarily interrupting the connection between the upper and lower portions of the conductor 37 through the thermostat device T, but unless the room temperature has dropped to 70° after the circuit is once interrupted and has started the burner 2 and closed the switch 21, no effect will be produced until the room temperature actually reaches the lower limit of the temperature differential.

When the conditions are such that the room temperature is above 72° and the burner 2 has been turned off or the operation of the heating means otherwise reduced, the temperature of the heating medium begins to fall, and in this case the thermostat plate 63 will be swung in the opposite direction, namely, in a clockwise direction as viewed in Figure 8. The initial movement of the plate 63 in this direction will first separate the contacts 101 and 102 and engage the contact 101 with the contact 103, thus arranging the circuits for operation in a manner similar to that set forth in connection with Figure 1, namely, for descending temperatures. In this case, then, the contact 101 will be in the position shown in dotted lines in Figure 7 with the result that the shunt circuit around the holding switch 21 is normally open because the globule of mercury remains at one end or the other of the mercury switch tube. However, as soon as the room temperature descends to the lower differential limit, namely 70°, the relay coil is energized in the usual manner, through conductor 31, contacts 15 and 16, conductor 27, relay coil 22, and conductor 26. The energization of the relay coil 22 immediately closes the line switch 20 and the holding switch 21, and now a holding circuit is established to maintain the relay coil 22 energized and the switches 20 and 21 closed. This circuit is as follows: From the secondary of the transformer 24 through conductor 26, relay coil 22, lead 35, switch 21, the lower portion 37a of conductor 37, conductor 86, contact 103, changeover switch blade contact 101, conductor 107, conductor 37, thermostat coil 12, contacts 13 and 15, and conductor 31, back to the secondary of the transformer. The moment, however, that the room temperature is increased to the upper differential limit, namely 72°, this holding circuit is broken at the contacts 13 and 15 and the relay 22 deenergized. However, as the temperature of the heating medium descends, the switch tube 65a will be oscillated every 15°, and at each oscillation the mercury globule within the tube will momentarily connect the electrodes 66 and 67. If the room temperature has fallen to 72°, the relay coil 22 will be energized, even though the switch 21 is open, by a circuit through conductor 26, relay coil 22, the lower portion of conductor 27, lead 51, the globule of mercury within the switch tube as it passes from one end to the other, the other lead 52, the lower conductor 37a, the lead 86, contact 103, the changeover switch blade contact 101, the conductor 107, the upper portion of the conductor 37, the thermostat coil 12, the engaged contacts 13 and 15, and the conductor 31. Thus, as the temperature of the heating medium descends, the burner is placed in operation the moment the room temperature has descended to the upper differential limit.

In the above mentioned arrangement, it will be observed that I have embodied in one system the two systems shown separately in Figures 1 and 5, respectively. Each system is controlled so as to be brought into operation during the portion of the cycle in which its use is of the greatest advantage, and in actual operation the normal condition is that the control mechanism floats between the two systems, that is, the temperature is accurately maintained between relatively narrow limits, but should either of the limits be exceeded for any reason, in one direction or the other, the control mechanism becomes active to bring the temperature up or down toward the other limit, thus immediately and automatically eliminating further fluctuations.

In the arrangements described above and embodying the principles of the present invention, temperature fluctuations were eliminated or reduced by means which operated to keep the temperature at or near either the upper differential limit or the lower differential limit, or by means utilizing a combination of such limit controls. The present invention also contemplates means for reducing or eliminating temperature fluctuations which is operative, as in the above modifications, only when the room temperature lies within the temperature differential of the room thermostat and is adapted, when the room temperature lies within this range, to throttle the operation of the heat source. That is to say, where the room thermostat is set to start up the heat source or otherwise increase the effectiveness thereof at one temperature and to stop the heat source or otherwise decrease the effectiveness thereof at another temperature, the present invention as embodied in the modification now to be described contemplates modifying this starting and stopping of the heat source or the increase and decrease in the effectiveness thereof, by operating the heat source in such a manner or at such a rate that its operation may be designated as lying intermediate the above mentioned starting up and shutting down or the increase and decrease in the effectiveness thereof.

As in the modifications previously described, in order to best show the relations involved in this form of my invention, I have chosen a hot water heater fired by a gas burner, the flow of gas being controlled in the first instance by a main gas valve opened and closed by electrical means. In Figure 9, however, I have embodied a slight addition. This addition comprises a device V embodying, first, a restriction in the form of an orifice plate 120 incorporated in the gas supply main 121 leading from the gas valve 7 to the furnace 1. Around the orifice plate 120 is arranged a by-pass line 124 in which is disposed an electrically controlled gas valve 125 of any known construction and operating to open and close the by-pass line 124.

So far as the operation of the structure just referred to is concerned, these parts operate as follows. When the main gas valve 7 is opened to receive a flow from the gas supply main 6, the gas reaches the burner through the line 121 and the orifice plate 120, and also through the by-pass line 124, providing the gas valve 125 is opened. When this valve is opened the furnace burner 2 receives the full gas flow, but if the valve 125 should be shut off, then the only flow reaching the gas burner 2 is that passing through the orifice plate 120. Under this condition, hereinafter referred to as a throttled flow, the furnace operates at a reduced heat.

According to the principles of the present invention, the by-pass gas valve 125 is controlled so as to be closed when the room temperature lies within the temperature differential of the room thermostat, namely, between 70° and 72° under the conditions assumed for the modifications previously described.

The means so controlling the gas valve 125 comprises the following. In the circuit including the room thermostat coil 12 and the conductor 37 there is embodied a relay coil 130 operating in conjunction with a plunger 131 which is connected with a switch 132 similar to the line switches 20 and 21 referred to above. In addition to the transformer 24, the line L is also provided with another transformer 134 which includes a primary 135 connected across the line L and a secondary 136 one end of which is connected by a conductor 137 with the electrically controlled valve 125 while the other end is connected through a conductor 138 with one end of the switch 132. If desired, however, the transformer 134 may be incorporated in or form a part of the transformer 24. A conductor 140 extends from the other terminal of the electrically controlled gas valve 125 to a contact point 141 closed and opened by the switch blade 132 which, it will be remembered, is under the control of the relay coil 130.

Whenever current flows through the relay coil 130, the switch 132 is closed, thereby completing the circuit through the secondary of the transformer 134 as follows: from the switch 132 through the conductor 138 to one end of the secondary 136, and from the other end of the secondary 136 through the conductor 137, the electrically controlled gas valve 125 and the conductor 140 back to the contact 141 engaged by the switch blade 132 when the relay coil 130 is energized. When current flows through this circuit the gas valve 125 is operated to close the by-pass line 124 so that gas admitted from the supply main 6 by the open gas valve 7 flows only through the throttled restriction 120. However, when the relay coil 130 is not energized the switch 132 is opened and the gas valve 125 is likewise open.

The circuits just described and illustrated in Figure 9 have been embodied in the control circuit similar to the one illustrated in Figure 1, which shows a room thermostat 10 operating, through a relay 22, to control the "on" and "off" position of the main gas valve 7 in such a way that whenever the room thermostat 10 closes the circuit through the relay coil 22 by engaging the switch blades 13 and 14 with their contacts 15 and 16, the line switch 20 is closed and this opens the main gas valve 7. As will be explained below and as indicated in Figure 9, a device T may be incorporated with the reduced fuel flow control, if desired, or it may be omitted. Assuming, first, that the device T is omitted in Figure 9, when both switch blades 13 and 14 engage their contacts 15 and 16, the room temperature as registered by the thermostat 10 is below 70°, under the conditions assumed. When the temperature of the room reaches 70° or slightly above, the connection at 14–16 is broken, but the relay 22 continues to be energized by a holding circuit that comprises the following: the conductor 31, contact 15, switch blade 13, thermostat coil 12, conductor 37, a direct connection across the conductors 107 and 86, switch 21, lead 35, relay coil 22, lead 26 and the secondary of transformer 24 back to the conductor 31. In this way, the continued energization of the relay coil 22 continues to hold the line switch 20 closed and thus to maintain the gas valve 7 open. This circuit through leads and conductors including conductors 31 and 37, is thus maintained closed so long as the switch blade 13 of the room thermostat 10 remains in engagement with the contact 15, but under the conditions assumed, the room thermostat 10 is arranged to separate these contacts when the room temperature as registered by the room thermostat reaches 72°, at which point the contacts are separated and the relay 22 deenergized, thus permitting the main gas valve 7 to close.

A characteristic feature of the above mentioned control, which I utilize in the modification of my invention illustrated in Figure 9, lies in the fact that whenever the room temperature is below 70° or above 72° no current flows through conductor 37, but current does flow through this conductor whenever the room temperature lies between 70° and 72° due to the fact that in this temperature range, the relay coil 22 is held energized by the flow of current through the holding switch 21, the conductor 37, the thermostat coil 12, contacts 13 and 15, and the conductor 31. Accordingly, therefore, I propose to make use of this characteristic feature by embodying my auxiliary relay coil 130 in the conductor 37, and such is the construction illustrated in Figure 9. In operation, therefore, as soon as the room temperature exceeds 70° and the contacts 14 and 16 separate, the conductor 37 carries the holding current, and the flow of this current through the relay 130 closes the switch 132 and energizes the by-pass gas valve 125 to close the by-pass line 124 thereby throttling the flow of gas to the boiler 1.

This is at once a simple and inexpensive yet efficient means for reducing temperature fluctuations. In the embodiment chosen to illustrate this feature, as long as the room temperature is below 70° the burner 2 is maintained in its full "on" position, but as soon as the room temperature reaches 70° the burner 2 is throttled by reducing the gas flow thereto, and this reduced heat is maintained until the room temperature as registered by the thermostat 10 reaches 72°, and then at this point the burner is shut off entirely. In this form, as well as in the forms of the invention previously described, it will be observed that the room thermostat 10 retains its normal control of the burner at all times. That is to say, when the room temperature is below 70°, the burner is turned on full, and when the temperature is above 72° the burner is shut off entirely. My invention is, of course, not necessarily limited to a hot water heater or the use of gas as a fuel. For example, oil burners may be utilized, or stokers, dampers or other control means, may be actuated by the circuits shown in Figure 9, and such means need not necessarily be entirely shut off at 72° or turned on full at 70°, the only requirement being that the device 125 be utilized to secure a control position intermediate the control positions normally effected by the room thermostat 10 at 70° and 72° room temperature.

It will also be noted from Figure 9 that in the circuits there shown I also contemplate the use of the device T referred to above although such is not essential to this feature of my invention. Referring for the moment to Figure 1, it will be remembered that, with the device T embodied in the otherwise conventional circuits associated with the room thermostat 10, whenever the temperature of the room has been above 72° and is descending, as soon as a temperature of 72° is reached and the temperature of the heating medium changes sufficiently to actuate the device T and oscillates the mercury switch tube 50, momentarily connecting the contacts associated with the conductors 51 and 52, the relay 22 is energized by a flow of current from the secondary of the transformer 24 to the conductor 31, the contact 15, the switch blade 13, the thermostat coil 12, the conductor 37, conductors 52 and 51, the lower portion of conductor 27, to the relay coil 22. Now in Figure 9, the same arrangement obtains, with the exception that the momentary flow of current through the conductor 37 also energized the relay 130 to pull up the switch 132. In order to most conveniently illustrate this arrangement, as well as the one shown in Figure 5, which will be referred to later, I have shown in Figure 9 the thermostat device T of Figures 7 and 8 (which includes the features of both Figures 1 and 5) as connected in the leads 27 and 37 in the same manner as the device is connected in Figures 1 and 5. Just as in the case of the arrangement shown in Figure 1, in Figure 9 for every 15° change in the temperature of the heating medium the contacts associated with the conductors 52 and 51 are closed momentarily as the mercury flows from one end of the tube 65a to another but as soon as the relay 22 is energized, even though momentarily, the switch 21 is closed, and thus the circuit through the conductor 37 is maintained through the lower portion of the conductor 37, contacts 101 and 103, since the temperature of the heating medium is descending, and the switch 21, although the conductors 52 and 51 no longer carry current. Thus, although to secure the advantages referred to in the previous paragraph it is not essential to embody the device T, yet when this device is used the control of the heat source is more accurate because, after the room temperature has been above 72° and has descended to 72° so as to engage the switch blade 13 with the contact 15, the device T responsive to changes in the temperature of the heating medium in the boiler 1, temporarily closes circuits to start up the burner, thus tending to maintain the room temperature at or very near the upper differential limit. However, where in Figure 1 the burner is started up full at 72°, in Figure 9 the burner is started up at a reduced rate, by virtue of the energization of the relay coil 130 serving to shut off the flow of gas through the by-pass 124 by closing the gas valve 125. Operating the burner at an intermediate rate is an important feature in that it may require only a relatively small amount of heat to maintain the room temperature at 72°. Of course, if this reduced heat is not sufficient to keep the room temperature at 72°, the upper differential limit in this instance, the temperature of the room will fall to 70° or below, but as soon as 70° is reached the switch blade 14 will engage the contact 16, and this will so reduce the flow through the conductor 37 that the relay coil 130 will no longer be sufficient to pull up the switch 132. The latter will then open and thus be energized by the gas valve control means 125 thereby opening the by-pass line 124 to permit a greater flow of gas to the burner 2. Thus, the burner 2 will be operated at its full "on" position until the lower differential limit is reached or exceeded, and then the burner will be reduced because then the flow of holding current through the conductor 37 will be sufficient to pull up the switch 132 and close the by-pass gas valve 125 to again reduce the flow of gas to the burner. The flow of gas is, of course, not fully shut off to the burner, because there is a throttled flow through the restriction 120, and this flow may be sufficient at this time to maintain the room temperature within the differential limit of 70°–72°, and if the room temperature reaches or exceeds 72°, the switch blade 13 separates from its contact 15, thus cutting off the entire flow of gas by the deenergization of the main gas supply valve 7. Then as the temperature of the heating medium descends and the room temperature coasts down to 72°, the burner is again started up, but at a reduced rate, as described above, and the above cycle of operation is resumed.

The throttling circuit, including the by-pass control valve 125, is also adapted to be installed in the arrangement shown in Figure 5. Figure 5, it will be remembered, shows illustrative circuits by which after the room temperature reaches the lower differential limit, namely, 70°, the device T, responsive to a change in the temperature of the heating medium, periodically opens the holding circuit through the conductor 37 to maintain the room temperature at or near the lower differential limit of 70°. The device T of Figures 7 and 8 when connected as shown in Figure 9 illustrates this arrangement and on ascending temperatures functions exactly like the arrangement shown in Figure 5, except that during the times that the holding switch 21 is maintained in closed position by the flow of holding current through the switch blade 13 and contact 15 and the conductor 37 and the mercury in the switch tube of the device T, the burner will be operated at reduced heat, since the current through the conductor 37 will energize the throttling relay 130 to close the by-pass valve 125. For example, after the burner has been shut off for some time and the temperature of the heating medium has fallen so that the room temperature swings down to 70°, the burner will be restarted at full heat and the temperature of the heating medium will ascend. This will swing the arm 100 out of engagement with the contact 103 and over into engagement with the contact 102 (dotted lines in Figure 9 and full lines in Figure 8), but as soon as the room temperature exceeds 70° contacts 14 and 16 will be separated and the flow of current energizing the coil 22 will be diverted from conductor 27 to switch blade 10, conductor 37, coil 130, lead 107, contact 101, conductor 37, coil 130, lead 107, contact 102, lead 106, the mercury in the tube 65a, conductor 86, switch 21 and back to the coil 22. The flow of current through the coil 130 keeps the switch 132, and hence the throttling valve 125, closed. However, as the temperature of the heating medium continues to rise, the movement of the notched plate 63 will oscillate the tube 65a and as the mercury runs from one end to the other the circuit through the coil 22 is broken and the holding switch immediately moves into its open position (Figure 9) and shuts off the burner.

Thus, according to the principles of the present invention, I have provided means, operative in either of the modifications shown in Figures 1 and 5, for operating the source of heat at a reduced rate whenever the temperature of the room lies within or between the upper and lower differential limits of the room thermostat 10. Specifically, during periods when the temperature of the heating medium is descending, the burner is not started up at full operation, as in the arrangement of Figure 1, but only at a reduced rate, when the room temperature reaches 72° but lies above 70°, and when the temperature of the heating medium is ascending, the burner is not shut off completely, as in the arrangement of Figure 5, but only partially, when the room temperature reaches 70° but is not above 72°. It is to be noted that in Figure 9 the device T, as well as the by-pass control means V including the valve 125, are each arranged to be operated only when the temperature of the room lies between the upper and lower differential limits, but when the room temperature lies above or below these limits, the room thermostat resumes its normal and conventional control.

In all of the modifications described above, the conventional control circuits associated with the boiler 1 or other source of heat have included what I have termed a holding circuit or its equivalent, this holding circuit serving to establish the temperature differential between the limits of which my control means have been made operative. It is to be understood, however, that the principles of my invention are in nowise limited to association with such controls. For example, many controls in use at the present time embody a unit movable to either of two positions, depending upon whether or not heat is required. For example, the member controlled may be a damper, a valve, or any other means serving to start up or shut off the fire or otherwise increase or decrease the effectiveness of the heat source. In Figure 10 I have shown a somewhat conventional means under the control of a room thermostat having a temperature differential, which has been assumed to be two degrees, namely, 70° to 72°, to correspond with the conditions assumed for the previous modifications.

Referring now to Figure 10, the reference numeral 150 indicates, for purposes of illustration, a gas valve having an operating arm 151 movable from an "off" position to an "on" position to shut off all supply of gas to the heater 1, gas being supplied to the valve 150 by the main 6, as previously described. The room thermostat is of somewhat simplified construction as compared with the room thermostat 10 referred to above, and in Figure 10 the room thermostat is indicated by the reference numeral 153 and embodies a temperature responsive coil 154 and a switch blade or contact arm 155 adapted to engage adjustable contacts 156 and 157. The inner end of the temperature responsive coil 154 is anchored, as at 160, and is connected through a conductor 161 to one side of the secondary of the transformer 24.

A double relay 165 is provided and includes a pair of coils 166 and 167 in which is disposed a pair of plungers or cores 170 and 171 connected together by a bar 172 the lower end of which is operatively connected, as at 173, with the end of the valve operating arm 151. The coils 166 and 167 are arranged to cooperate with the cores 170 and 171, respectively, so as to shift the valve operating arm 151 in one direction or the other, depending upon which one of the relay coils 166 and 167 is energized. The adjacent ends of the coils 166 and 167 are connected, respectively, with a pair of contacts 175 and 176 which are adapted to be engaged by a switch contact arm 177 connected, by a lost motion connection if necessary, to be operated by the bar 172 and anchored, as at 178, to a fixed pivot. The switch arm 177 is connected at 179 with a conductor 180 which leads to the end of the secondary of the transformer 24 opposite the end to which the conductor 161 is connected. The opposite ends of the relay coils 166 and 167 are connected, respectively, with the thermostat contacts 156 and 157, conductors 182 and 183 being provided for this purpose.

Suitable snap mechanism is associated with the shiftable plungers 170 and 171, and this mechanism may take any convenient form. For purposes of illustration, I have shown the upper end 190 of the relay coil cores connected to a pair of outwardly diverging links 191 and 192, the outer ends of which are connected together by a spring 193. The outer ends of the links 191 and 192 are constrained for lateral movement only by suitable guides 196 and 197. By virtue of this construction, the links 191 and 192 serve as a toggle to interpose resistance to the initial shifting movement of the relay cores, but once this initial resistance is overcome the relay cores snap to their opposite position.

So far as the structure described above is concerned, the operation is substantially as follows. When the parts are in the positions shown in full lines in Figure 10, the gas valve 150 has been turned off so that no gas is supplied to the burner 2. Consequently, the room temperature will fall, and as this occurs the thermostat coil 154 will swing the thermostat blade or arm 155 toward the left as viewed in Figure 10 so that, at 70° room temperature under the conditions assumed, the arm 155 will move to its dotted line position and will engage the contact 156. This immediately establishes a circuit from one end of the secondary of the transformer 24 through the conductor 161, the thermostat coil 154, the thermostat arm 155, the contact 156, the conductor 182, the relay coil section 166, the contact 175, the switch arm 177, and the conductor 180 back to the other side of the secondary of the transformer 24. This energizes the coil 166 and exerts a downward pull upon the core 170 which moves the bar 172 downwardly, carrying with it the other core 171 and swinging the valve arm 151 to its "on" position, shown in dotted lines. The snap mechanism described above serves to secure a positive shifting of the valve arm 151 from one position to another. The downward movement of the relay cores 170 and 171 automatically shifts the switch arm 177 to its dotted line position as shown in Figure 10 so that the outer end of the arm 177 now engages the contact 176 which is associated with the other relay coil 167.

Since the valve 150 is now open the boiler 1 will send up heat to the room or rooms and the temperature therein will rise. The rising temperature causes the thermostat arm 155, which was moved to its dotted line position by the falling temperature, away from the contact 156, but this is of no effect because the switch arm 177 was drawn away from the contact 175 and shifted into its dotted line position at the time that the valve 150 was opened to admit gas to the burner. The room temperature then continues to rise until it has reached approximately 72° as registered by the room thermostat, and at this point the thermostat arm 155 has been shifted back to its full line position shown in Figure 10. At the instant it engages the contact 157, a circuit is established from the conductor 161 connected to one side of the secondary of the transformer 24, through the thermostat coil 154, the arm 155, the contact 157, the connector 183, the relay coil 167, the contact 176, the switch arm 177 (dotted line position), and the conductor 180, back to the other end of the secondary of the transformer 24. As soon as the relay coil 167 is energized the relay cores 170 and 171 are shifted, upwardly in Figure 10, back to the position as shown in full lines in Figure 10. This shuts off the valve 150 and again brings the switch arm 177 up against the contact 175, whereupon the control means is adapted to again start up the gas burner just as soon as the temperature within the room again falls to 70° and the thermostat arm 155 engages the contact 156.

Thus, according to the control means just described, the valve 150 is opened when the room temperature descends to 70° and is closed when the room temperature rises to 72°. If this were the only control means associated with the boiler 1 or other source of heat, the heating plant would be subject to the disadvantages mentioned in the first part of this specification. That is, the temperature would swing downwardly too far and upwardly too far for best comfort conditions and the room temperature would actually vary over a range exceeding the theoretical two degree temperature differential of the thermostat 153.

According to the principles of the present invention I have provided an auxiliary control, actually forming a part of the control circuits just described and intimately associated therewith for controlling the position of the valve 150 in accordance with, not only room temperature, but also the temperature of the heating medium through which the boiler 1 or other source of heat sends heat up to the rooms or other space to be heated. In Figure 10 it will be observed that this auxiliary device is the same as the device T shown in Figure 1 with its leads 51 and 52 connected, respectively, with the conductors 161 and 182 and serving to by-pass the thermostat blade 155 and the contact 156. From the description of the device T shown in Figure 1 it will be remembered that the boiler thermostat 45 serves to oscillate the mercury switch tube 50 at each period of 15° change in the temperature of the heating medium. It will also be remembered that the electrodes associated with the conductors 51 and 52 are disposed in the central portion of the switch tube 50 and are normally open except during the brief interval of time when the oscillation of the switch tube 50 shifts the globule of mercury contained therein from one end to the other, the globule of mercury in passing the electrodes associated with the conductors 51 and 52 serving thereby to momentarily connect these conductors. Since these conductors are connected with the conductors 161 and 182, it will be seen that wherever there is a 15° change, under the conditions assumed, in the temperature of the heating medium the conductors 161 and 182 will be electrically connected. Now if the valve 150 has already been turned off by virtue of the temperature within the room descending to 72° and by the thermostat blade 155 previously engaging the contact 157 so as to bring the parts to their full line positions shown in Figure 10, the momentary connection of the conductors 161 and 182 will have exactly the same effect as if the room temperature had descended to 70° to bring the thermostat arm 155 against the contact 156. That is, as the globule of mercury passes the electrodes within the switch tube 50, a circuit will be established from one end of the secondary of the transformer 24 through the lower portion of the conductor 161, the conductors 51 and 52, the lower portion of the conductor 182, the upper relay coil 166, the contact 175, the switch arm 177, and the conductor 180, back to the other end of the secondary of the transformer 24. This momentary short circuiting of the conductors 161 and 182 has the effect of again starting up the burner. However, if the room temperature is still at or above 72°, the burner will be immediately shut off as soon as the switch arm 177 engages the contact 176. But if the room temperature has descended even slightly below 72°, so as to move the thermostat arm 155 away from the contact 157, the burner will be kept on until the room temperature reaches 72°, and then the arm 155 will engage the contact 157 and will energize the coil 167 which swings the valve arm 151 upwardly to shut off the valve 150.

Thus, in this modification, at every 15° change in the temperature of the heating medium, the device T operates to start up the burner 2 if, for any reason, the room temperature has descended even slightly below the upper differential limit, namely 72° under the conditions assumed. If, on the other hand, the temperature of the room is still above 72°, as soon as the oscillation of the switch tube 50 causes the valve 151 to be swung downwardly, this will carry with it the switch blade 177 which will engage the contact 176, but since the thermostat arm 155 is still in engagement with the contact 157, the relay 167 will immediately be energized to swing the switch arm 177 and the valve arm 151 back to the position shown in full lines in Figure 10. However, by this time, the mercury switch tube 50 has completed its oscillation and the mercury is not in a position to short circuit the electrodes therein, and hence the valve 150 will remain shut off until the temperature of the heating medium has changed another 15°.

It will be observed that the modification just described operates on what has been termed the descending principle. That is, as the room temperature descends from above 72° to a point slightly below 72°, then at certain thermal periods the control is adjusted to bring the burner back on, even though the lower thermostat differential has not yet been reached by the room temperature, and maintained in operation until the room temperature is again brought up to 72°.

The principles of the present invention as illustrated in this type of control may also be embodied therein when arranged on what has been termed the ascending principle. Referring now to Figure 11, it will be observed that the only difference between this figure and the showing in Figure 10 is that the thermostat device T, instead of being connected with the conductor 182, has been connected with the conductor 183. The result of this arrangement, the room temperature is maintained substantially at 70°, for at every 15° interval of temperature change in the heating medium, the device T operates to shut off the burner by closing the valve 150, and the valve is not opened unless and until the room temperature falls to 70°. Figure 11 in full lines shows the valve 150 open by the previous energization of the relay coil 166 by the thermostat arm 155 previously engaging the contact 156, drawing the core 170 within the relay coil 166. The thermostat device T, it will be remembered, oscillates every 15° change to temporarily short circuit the electrodes connected with the conductors 51 and 52. Now assuming that the water temperature has changed to the extent of 15° and the mercury switch tube is oscillated, the mercury globule within the tube will establish a circuit from the secondary of the transformer 24 through the lower portion of the conductor 161, the conductors 51 and 52, the lower portion of the conductor 183, the relay coil 167, the switch contact 176, the switch arm 177, and back to the secondary of the transformer through the conductor 180. This energizes the relay coil 167, causing the same to draw up on the plunger or core 171, swinging the valve arm 151 and the switch blade 177 to their "off" positions, shown in dotted lines. If, for example, the room temperature has risen slightly above 70° so that the thermostat arm 155 leaves the contact 156, the switch arm 177 will remain in its "off" or dotted line position, to which it was moved by the energization of the relay coil 167 as just described. If the room temperature remains even slightly above 70°, any subsequent temperature change of the heating medium, which would cause the thermostat device T to oscillate again, will have no effect because, although the mercury globule would short circuit the conductors 51 and 52, no circuit would be established because the switch arm 177 has been swung to its upper position or "off" position in engagement with the contact 175 but out of engagement with the contact 176. Thus, the burner will remain shut off, notwithstanding any subsequent operation of the thermostat device T, until the room temperature drops to approximately 70° or until the thermostat arm 155 engages the contact 156. At this point, then, the relay coil 166 will be energized and will draw in the plunger 170, swinging the gas valve arm 151 back to its lower or "on" position, this position being shown in full lines in Figure 11, and likewise the switch arm 177 is moved to its full line position in engagement with the contact 176. Now a subsequent change of 15° in the temperature of the heating medium will again cause the thermostat device T to oscillate, and, therefore, again will the relay coil 167 be energized to shut off the gas valve 150. However, this does not occur immediately. It will be remembered that as the room temperature falls to 70° it is likely that the temperature of the heating medium, in changing 15°, will also fall. But the moment 70° room temperature is reached the burner is started up by the opening of the valve 150, and in this case then the temperature of the heating medium would tend to increase. This change of decreasing the temperature of the heating medium to increasing the temperature of the heating medium somewhat delays the total of 15° change required to effect an oscillation of the device T. However, when this oscillation does occur, the burner will again be shut off, as just described, and will remain shut off until the room temperature falls to 70°. If, by any chance, the room temperature is actually at 70° when the thermostat device T does oscillate, then immediately following the shutting off of the valve 50, the latter will be opened again, for although the thermostat device T will short circuit the conductors 51 and 52, sending the energizing current through the relay coil 167 and the switch arm 177, which is in its lowered position, as soon as the cores 170 and 171 are moved upwardly, carrying with them the switch arm 177, and as soon as this latter arm engages the contact 175, the relay coil 166 will be energized, since, the room temperature being at 70°, the thermostat arm 155 closes the circuit through the relay coil 166 by being in engagement with the contact 156.

From the above description it will thus be seen that whenever there is a 15° change in the temperature of the heating medium, whether up or down, the burner will be shut off and will not be started up again until the temperature reaches 70° or unless it is actually at 70°. Thus, the room temperature is prevented from rising beyond 70° by periodically shutting off the burner if it has exceeded 70° even slightly.

It will also be understood that the two types or systems of control means, shown separately in Figures 10 and 11, may be combined in one operative system in the same manner that the two systems shown separately in Figures 1 and 5 were operatively combined by constructing the device T as shown in Figure 8.

For example, referring now to Figure 12, the lead 51 is left in the same position shown in Figures 10 and 11 but the shaft 62 of the device T of Figures 10 and 11 is equipped with the changeover switch blade 100 of Figure 8, which carries the contact 101, and the contacts 102 and 103 are connected by leads 52a and 52b, respectively, with the conductors 183 and 182, while the fixed contact plate 101a is connected to the other lead 52. Figure 12 illustrates the parts as they are disposed after the burner has been continued for a time sufficient to bring the room temperature up above 72° and has been shut off so that the temperature of the heating medium is descending. Since the temperature of the heating medium is falling, the rotation of the thermostat shaft 62 swings the contact 101 along the contact plate 101a and into engagement with the contact 103. This serves to connect the lead 52b, which is in connection with the conductor 182, with the lead 52, so that when the temperature of the heating medium is descending the device T of Figure 12 is arranged in the same manner as the device T of Figure 10, and as pointed out above in connection with that figure, as the temperature of the heating medium descends the mercury tube 65 oscillates back and forth so that the globule of mercury temporarily connects the leads 51 and 52 and will momentarily start up the burner by energizing the coil 166, which pulls the plunger 170 downwardly. If at this time the room thermostat 155 engages the contact 157, as soon as the switch arm 177 reaches its "on" or lower position the lower coil 167 will be immediately actuated and will restore the burner valve 150 to its "off" position (full lines in Figure 12). However, as soon as the room temperature has fallen to or slightly below 72°, the room thermostat 155 leaves the contact 157, and then at the next subsequent operation or oscillation of the mercury switch tube 65 by the rotation of the notched segment 63, as the temperature of the heating medium continues to descend, the coil 166 will be energized momentarily and this will swing the burner valve 150 into its "on" position and will carry the switch arm 177 to its lower position. However, since the room thermostat switch blade 155 has left the contact 157, the parts remain in their "on" position (dotted lines, Figure 12). Thus, the burner will be started up practically as soon as the room temperature falls to 72° or slightly below. It will be observed that this operation is substantially the same as the operation of the arrangement shown in Figure 10.

After the burner has been started up, the heat supplied to the system begins to raise the temperature of the heating medium, and now the shaft 62 of the thermostat T begins to turn in a counterclockwise direction (Figure 12) and this swings the changeover switch arm 100 into the dotted line position shown in Figure 12, connecting the lead 52 through the lead 52a to the conductor 183, which then arranges the parts for operation in exactly the same manner as is illustrated in Figure 11, namely, for ascending temperatures. Now, by changing the system over to an arrangement like that shown in Figure 11, with the changeover blade making a connection between the contact 102 and the fixed contact 101a, the next oscillation of the switch tube 65 as the temperature of the heating medium ascends will shut off the burner by making a connection between conductors 161 and 182 and the burner will not be restarted unless the room temperature has fallen to 70° or below, or, in other words, unless the thermostat arm 155 is in a position engaging the contact 156. It will be observed that this operation is substantially the same as the operation of the arrangement shown in Figure 11.

From the above description of certain preferred embodiments illustrative of the present invention, it will be understood that my invention is not to be limited to the specific details shown and described above. Thermostats having an operative thermal differential and circuits involving holding relay coils, valves and the like are, in and of themselves, well known to those skilled in the art. Likewise, mercury switches having one or more electrodes are also well known in the art and it is to be distinctly understood that any means by which momentary contact may be had, or momentary interruption of a circuit may be accomplished, may be utilized in carrying out the principles of the present invention and I do not claim as my invention any specific detail of these elements. For example, instead of mercury tube switches and similar contacts, I may utilize metal to metal contacts operated by cams or the equivalent.

Likewise, it is also to be understood that my invention, while illustrated in connection with the hot water system, is equally applicable to other types of heating plants, such as hot air, steam vapor, and the like and that the above described illustration of the hot water heating plant was adopted merely for convenience in illustrating the principles involved. The generic aspects of my invention wherein the burner or other heat source is controlled within or between the differential limits of the usual room thermostat, whose control on the heat source is not in any way relinquished, could be embodied in almost any of the types of control circuits in use at the present time.

What I claim, therefore, and desire to secure by Letters Patent is:

1. In a heating system having a controllable source of heat, and a medium heated by said source and adapted to be directed to the room to be heated, the combination of a thermostat responsive to the temperature in the room to be heated and operative, outside a given temperature differential within which said thermostat is normally inoperative, to change the operation of said heat source and means responsive to a temperature change of the heating medium for controlling said heat source at any point within the temperature range of the heating medium during periods of room temperature within the differential of said room thermostat.

2. In a heating system having a controllable source of heat, a medium heated by said source and adapted to be directed to the room to heat the same, and a thermostat in the room to be heated and operative to start the heat source at one room temperature and to stop the same at a different room temperature, and means responsive to a change in the temperature of the heating medium for controlling said source of heat at any point within the temperature range of the latter during periods of room temperature within the differential of said thermostat.

3. In a heating system having a controllable source of heat, a medium heated by said source and adapted to be directed to the room to heat the same, and a thermostat in the room to be heated for controlling said source and operative to start the same at one room temperature and to stop the same at a different room temperature, a second thermostat responsive to successive changes in the same direction in the temperature of the heating medium, and connections actuated by said second thermostat for separately controlling said source of heat for preventing excessive changes in the temperature of the heating medium during the time the room temperature lies within the temperature differential of the room thermostat.

4. In a heating system embodying a controllable source of heat, a medium adapted to receive heat from said source and to be directed to the room to be heated, a thermostat responsive to room temperature, and switch mechanism controlled by said thermostat for accelerating and decelerating the operation of said heat source, the combination of a holding circuit energized by the movement of the thermostat to one position, corresponding to one temperature, and operative to maintain said switch in closed position until the thermostat has been shifted to another position by a change in the temperature of the room, and a second thermostat responsive to the temperature of said heating medium and operative to open the holding circuit in accordance with a given change in the temperature of the heating medium at any point within the temperature range of the heating medium but within the differential limit of the first thermostat to decelerate the operation of said heat source.

5. In a heating system having a controllable source of heat, a medium heated by said source and adapted to be directed to the room to heat the same, and a thermostat in the room to be heated for controlling said source and operative to start the same at one room temperature and to stop the same at a different room temperature, the combination of means successively responsive to the occurrence of given temperature changes in the heating medium, and means interconnecting said temperature responsive means with said thermostat as the temperature of the heating means fluctuates for periodically modifying the control of said source by said thermostat, within the differential range of the thermostat, for maintaining the room temperature near one of the limits of said room thermostat differential.

6. In a heating system having a controllable source of heat and a medium heated by said source and adapted to be directed to the room to heat the same, the combination of a thermostat in the room to be heated for controlling said source and operative to start the same at one room temperature and to stop the same at a different room temperature, means responsive to temperature changes in the heating medium, and means interconnecting said temperature responsive means with said thermostat whereby as the temperature of said heating medium increases by given increments said temperature responsive means is periodically operative to stop said source of heat after the room temperature has reached the lower differential limit of the thermostat.

7. In a heating system having a controllable source of heat and a medium heated by said source and adapted to be directed to the room to heat the same, the combination of a thermostat in the room to be heated for controlling said source and operative to start the same at one room temperature and to stop the same at a different room temperature, means responsive to the temperature of the heating medium, means interconnecting said temperature responsive means with said thermostat whereby, if the temperature of the heating medium decreases, said temperature responsive means is operative to start said source of heat when the room temperature has fallen below the upper differential limit of the thermostat, and means operative when the temperature of the heating medium increases for causing said temperature responsive means to stop said source of heat when the room temperature has risen above the lower differential limit of the thermostat.

8. In an automatic heating system embodying a burner, a medium heated by said burner and adapted to be directed to the room to be heated, and a thermostat responsive to room temperature and operative at one given temperature to start the burner and at a higher temperature to cut out the burner, the combination of means associated with the thermostat and responsive to an increasing temperature of said heating medium for cutting out the burner whenever the room temperature has been brought up to substantially the lower limit of the temperature differential of said thermostat, and means connected around the thermostat and responsive to a decreasing temperature of said heating medium for starting up the burner whenever the room temperature has fallen to a point substantially at the upper limit of said temperature differential, thereby preventing excessive fluctuations in the amount and rate of heat delivered to said room.

9. In an automatic heating system embodying a burner, a medium heated by said burner and adapted to be directed to the room to be heated, the combination of a first relay means for starting up said burner, a second relay means for stopping said burner, a thermostat responsive to room temperature and operative at one given temperature to energize said first relay means to start the burner, said thermostat being operative at a lower temperature to energize said second relay means to cut out the burner, and means connected around the thermostat and cooperating with one of said relay means for changing the operation of said burner when the temperature of the room lies between said above mentioned temperatures.

10. In an automatic heating system embodying a burner, a medium heated by said burner and adapted to be directed to the room to be heated, the combination of a first relay means for starting up said burner, a second relay means for stopping said burner, a thermostat responsive to room temperature and operative at one given temperature to energize said first relay means to start the burner, said thermostat being operative at a higher temperature to energize said second relay means to cut out the burner, and means connected around the thermostat and responsive to a rise in the temperature of said heating medium at any point within the temperature range of the heating medium and within the differential limits of the thermostat for cutting out the burner whenever the room temperature has been brought up to substantially the lower limit of the temperature differential of said thermostat.

11. In an automatic heating system embodying a burner, a medium heated by said burner and adapted to be directed to the room to be heated, the combination of a first relay means for starting up said burner, a second relay means for stopping said burner, a thermostat responsive to room temperature and operative at one given temperature to energize said first relay means to start the burner, said thermostat being operative at a higher temperature to energize said second relay means to cut out the burner, and means connected around the thermostat and responsive to a fall in the temperature of said heating medium at any point within the temperature range of the heating medium and within the differential limits of the thermostat for starting up the burner whenever the room temperature has fallen to a point substantially at the upper limit of said temperature differential.

12. In a heating system having a controllable source of heat and a transfer medium heated thereby, the combination of a thermostat responsive to the temperature in the room to be heated and operative, outside a given temperature differential within which said thermostat is normally inoperative, to change the operation of said heat source, and means responsive to successive changes in the same direction in the temperature of said heat transfer medium and connected with said thermostat so as to be operative only within said temperature differential thereof for additionally controlling said heat source.

13. In a heating system having a controllable source of heat, and a medium heated by said source and adapted to be directed to the room to be heated, the combination of a thermostat in the room to be heated for controlling said source and operative to start the same at one room temperature and to stop the same at a different room temperature, and means responsive to a change in either direction in the temperature of said heating medium at any point in the temperature range of the latter for temporarily controlling the operation of said heat source to prevent a further change in the temperature of said heating medium as long as the room temperature lies within the temperature differential of said thermostat.

14. In a heating system having a controllable source of heat and a medium heated by said source and adapted to be directed to the room to heat the same, the combination of a thermostat in the room to be heated for controlling said source and operative to start the same at one room temperature and to stop the same at a different room temperature, means responsive to the temperature of the heating medium and including a part shiftable into successive positions as the temperature of said heating medium decreases, and means interconnecting said part with said thermostat whereby as said part is moved into any one of its succeeding positions, said temperature responsive means is operative to start said source of heat whenever the room temperature has fallen below the upper differential limit of the thermostat.

15. In a heating system having a controllable source of heat, and a medium heated by said source and adapted to be directed to the room to be heated, the combination of a thermostat responsive to the temperature in the room to be heated and operative outside a given temperature differential to increase and decrease the effectiveness of said heat source, and means operative within the differential of said thermostat for effecting an intermediate control of said heat source, comprising a second thermostat periodically responsive to a progressively changing temperature of the heating medium for modifying the effectiveness of said heat source as long as the temperature of the room lies between the differential limits of said first thermostat.

16. In a heating system having a controllable source of heat and a medium heated by said source and adapted to be directed to the room to heat the same, the combination of a thermostat in the room to be heated for controlling said source and operative to start the same at one room temperature and to stop the same at a different room temperature, means responsive to the temperature of the heating medium and including a part shiftable into successive positions as the temperature of said heating medium increases, and means interconnecting said part with said thermostat whereby as said part is moved into any one of its succeeding positions, said temperature responsive means is operative to stop said source of heat whenever the room temperature has reached the lower differential limit of the thermostat.

17. A heating system comprising, in combination with a heating plant having a source of fuel supply, an electric valve controlling the supply of fuel from said source to said heating plant, auxiliary means for supplying a minimum amount of fuel independently of said controlling means, a control device controlling the entire supply of fuel delivered to the heating plant through both said controlling means and said auxiliary means, temperature-controlled means for turning on the control device when room temperature drops below a predetermined temperature and for turning off the control device if the room temperature rises above a higher predetermined temperature, said temperature controlled means including a holding circuit energized when room temperature lies between said predetermined temperatures, and an electro-magnetic relay in said holding circuit controlling the energizing circuit for said electric valve for opening and closing the same as room temperature drops below and rises above said first predetermined temperature.

EARL L. TORNQUIST.

CERTIFICATE OF CORRECTION.

Patent No. 2,184,982.

December 26, 1939.

EARL L. TORNQUIST.

It is hereby certified that error appears in the printed specification of the above numbered patent requiring correction as follows: Page 15, first column, lines 63 and 64, claim 2, strike out the words "at any point within the temperature range of the latter" and insert the same after "medium" in line 63, same claim; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.

stat in the room to be heated for controlling said source and operative to start the same at one room temperature and to stop the same at a different room temperature, means responsive to the temperature of the heating medium and including a part shiftable into successive positions as the temperature of said heating medium increases, and means interconnecting said part with said thermostat whereby as said part is moved into any one of its succeeding positions, said temperature responsive means is operative to stop said source of heat whenever the room temperature has reached the lower differential limit of the thermostat.

17. A heating system comprising, in combination with a heating plant having a source of fuel supply, an electric valve controlling the supply of fuel from said source to said heating plant, auxiliary means for supplying a minimum amount of fuel independently of said controlling means, a control device controlling the entire supply of fuel delivered to the heating plant through both said controlling means and said auxiliary means, temperature-controlled means for turning on the control device when room temperature drops below a predetermined temperature and for turning off the control device if the room temperature rises above a higher predetermined temperature, said temperature controlled means including a holding circuit energized when room temperature lies between said predetermined temperatures, and an electro-magnetic relay in said holding circuit controlling the energizing circuit for said electric valve for opening and closing the same as room temperature drops below and rises above said first predetermined temperature.

EARL L. TORNQUIST.

CERTIFICATE OF CORRECTION.

Patent No. 2,184,982. December 26, 1939.

EARL L. TORNQUIST.

It is hereby certified that error appears in the printed specification of the above numbered patent requiring correction as follows: Page 15, first column, lines 63 and 64, claim 2, strike out the words "at any point within the temperature range of the latter" and insert the same after "medium" in line 63, same claim; and that the said Letters Patent should be read with this correction therein that the same may conform to the record of the case in the Patent Office.

Signed and sealed this 20th day of February, A. D. 1940.

Henry Van Arsdale,
Acting Commissioner of Patents.

(Seal)